(12) United States Patent
Abecassis

(10) Patent No.: US 6,192,340 B1
(45) Date of Patent: Feb. 20, 2001

(54) INTEGRATION OF MUSIC FROM A PERSONAL LIBRARY WITH REAL-TIME INFORMATION

(76) Inventor: Max Abecassis, 3207 Clint Moore Rd. #205, Boca Raton, FL (US) 33496

( * ) Notice: Under 35 U.S.C. 154(b), the term of this patent shall be extended for 0 days.

(21) Appl. No.: 09/420,852

(22) Filed: Oct. 19, 1999

(51) Int. Cl.[7] .............................. G10L 11/00; H04H 7/00; H04B 1/18; H04M 3/00
(52) U.S. Cl. ......................... 704/270; 704/275; 455/6.3; 455/418; 455/185.1
(58) Field of Search .................................. 704/200, 270, 704/500, 503, 272, 275; 455/6.3, 418, 185.1

(56) References Cited

U.S. PATENT DOCUMENTS

| | | |
|---|---|---|
| 4,788,675 | 11/1988 | Jones et al. . |
| 5,231,661 | 7/1993 | Harnum et al. . |
| 5,299,125 | 3/1994 | Baker et al. . |
| 5,371,532 * | 12/1994 | Gelman et al. ......................... 348/7 |
| 5,434,678 | 7/1995 | Abecassis . |
| 5,524,051 | 6/1996 | Ryan . |
| 5,539,635 | 7/1996 | Larson, Jr. . |
| 5,557,541 | 9/1996 | Schulhof et al. . |
| 5,590,195 | 12/1996 | Ryan . |
| 5,600,573 | 2/1997 | Hendricks et al. . |
| 5,675,575 * | 10/1997 | Wall, Jr. et al. ..................... 370/326 |
| 5,684,918 * | 11/1997 | Abecassis ............................... 386/83 |
| 5,742,893 | 4/1998 | Frank . |
| 5,781,886 * | 7/1998 | Tsujiuchi .............................. 704/275 |
| 5,809,246 | 9/1998 | Goldman . |
| 5,815,671 | 9/1998 | Morrison . |
| 5,841,979 * | 11/1998 | Schulhof et al. .................... 704/500 |
| 5,940,797 | 8/1999 | Abe . |
| 5,956,629 | 9/1999 | Morrison . |
| 5,960,406 | 9/1999 | Rasansky et al. . |

OTHER PUBLICATIONS

"MusicMatch Jukebox", http://musicmatch.com/, http://musicmatch.com/about_us/, http://musicmatch.com/jukebox/, MusicMatch Inc., Sep. 29, 1999.

MusicMatch 4.20.0048 software, Help Topics: MusicMatch Jukebox v4 [selcted topics], Copyright 1999 MusicMatch, Inc.

"RealNetworks– The Home of Streaming Media", http://www.real.com/, http://www.real.com/producs/realjukebox/index.html?src=hp_butn,home RealNetworks Inc., Oct. 18, 1999.

"AltaVista Home", http://www.altavista.com/, AltaVista Company, Oct. 18, 1999.

"Yahoo!", http://www.yahoo.com/, Yahoo! Inc., Oct. 18, 1999.

"MSN Search", http://auto.search.msn.com/, Microsoft Corporation, Oct. 18, 1999.

"The Nasdaq Stock Market", http://www.nasdaq.com/, The Nasdaq Stock Market, Inc., Oct. 18, 1999.

* cited by examiner

Primary Examiner—Tālivaldis I. Šmits
Assistant Examiner—Daniel A. Nolan

(57) ABSTRACT

An apparatus capable of, and a method of, playing audio, the apparatus comprising communicating, processing, and playing means for, and the method comprising the steps of: communicating a user's information preferences to an information provider; receiving, from the information provider, informational items that are responsive to the user's information references; interleaving and sequencing, for the user, a playing of the received informational items with a playing of a plurality of musical items included in an audio library of the user; and playing, for the user and responsive to the interleaving and sequencing, the received informational items within a playing of the plurality of musical items; and wherein the playing comprises a voice synthesizing of an at least one of informational item; wherein the playing is responsive to a schedule preferences of the user; wherein a verified apparent listening of a playing of an informational item is associated with a credit; and/or wherein a user's reception of a communication unrelated to the informational items is integrated within a playing of musical items.

20 Claims, 11 Drawing Sheets

INTEGRATION OF MUSIC FROM A PERSONAL LIBRARY WITH REAL-TIME INFORMATION

BACKGROUND OF THE INVENTION

1. Field of the Invention

Systems for, and methods of, integrating a playing of music that is responsive to a user's music preferences applied to the user's audio library with a playing of real-time information that is responsive to the user's information preferences.

2. Description of the Related Art

A number of radio markets offer listeners a substantial variety of musical and/or informational radio broadcast formats. Real-time broadcasts offer the advantages of companionship, currency, and exposure to music not previously listened to by a particular listener. However, a broadcast, by definition, cannot intend to play a particular listener's favorite selection of songs or precisely the information that is of interest to that listener.

Clearly, systems that permit a user to play only the favorite songs from a library of music offer advantages of customized selection that cannot be duplicated by a broadcast format. Limiting the playing to songs from a personal library, also avoids having to listen to commercials, or to unsuitable or undesirable content. However, such systems do not provide, for example, news information, or the sense of currency and companionship that a real-time broadcast offers.

SUMMARY OF THE INVENTIONS

The term "audio" refers to any audible content, tone, or sound regardless of the source or technology implemented. Audio includes, for example, music, songs, tunes, tracks, titles, voice, speech, content similar to or analogous to content that may be provided by a broadcast radio station, and sounds including the unheard sound of a tree falling in the forest. Audio also comprises information that is associated with, may be associated with, or may serve to produce, an audible content. Audio may be part of, be extracted from, and/or be generated from, text, data, information, or video, e.g., a track from a DVD-Video. Audio may be part of, be extracted from, and/or be generated from video including, for example, still characters, graphics, images, motion pictures, films, interactive electronic games, and multimedia productions; music videos, full motion pictures, and television programming; and news, sports, cultural, entertainment, commercial, advertisements, instructional, and educational programming.

Audio may originate as, and/or be provided as, an analog or digital format, compressed or uncompressed, by a human voice or synthesized, naturally occurring, instrumental, or humanly, created, edited, or otherwise produced, and/or any combination thereof. The audio may be provided by a local source, e.g., storage, media, memory, device, CD, DVD-Audio, magnetic disk; by a remote source, e.g., radio broadcast, FM station, or "transmission"; and/or any combination thereof. A transmission may be provided by a private or public, broadcast or pointcast, wired or non-wired means and/or capability; and may utilize one or a hybrid combination of, for example, fiber optic cable, coaxial cable, twisted copper wire, cellular, radio, and/or satellite based technologies, systems, and infrastructures. In the broadest sense, a transmission also comprises the utilization of, for example, the U.S. Postal Service to deliver a CD.

The term "user" as used herein is meant to include and be interchangeable with the term "player" (when referring to a person), and is to be understood in the general sense of a person that may be utilizing, playing, and/or listening to audio.

The term "music preferences" refers, principally, although not exclusively, to a preference or preferences for audio which is musical in character, such as songs which may be played from a CD or listened to from an FM radio broadcast.

The term "information preferences" refers, principally, although not exclusively, to a preference or preferences for audio which is informational in character, such as the audio that is produced by an AM radio broadcast between the playing of songs, including, for example, information relating to the song being played, and/or news, weather, and traffic reports, jokes, quotes, inspirational or motivational messages, advertisements, and programming of a non-musical nature.

The term "schedule preferences" refers to a time based preference or preferences, such as when certain audio, music, and/or information is to be played.

The term "technical preferences" refers to a preference or preferences for, for example, the relative volume and playback speed of the different categories of information, and the voice to be utilized in the synthesizing of information.

The term "radio-on-demand" refers to audio played for a user and that is responsive to at least the user's music and information preferences. Radio-on-demand enables, for example, a user to enjoy the playing of songs selected from a CD album synergistically interleaved with a playing of synthesized real-time stock quotes for the user's stock portfolio. Radio-on-demand is not specific to any particular local and/or remote sources of audio.

The term "audio library" refers to a plurality of audio items. An audio library may contain the data, information, or content required to make audible the audio item ("physical audio item") and/or a link, pointer, address, or location to the data, information, or content required to make audible the audio item ("virtual audio item"). An audio library can comprise a plurality of audio items from a single source or from a plurality of local and remote sources. An audio library of a user can comprise, consist of, and/or be obtained from, for example,: i) selected audio items from a single optical memory, device, and/or disc such as a DVD; ii) selected audio items from a collection of CDs and DVDs; iii) audio items obtained, from a variety of local and remote sources and stored in, for example, the hard disk of a PC; iv) URLs of specific audio items retrievable from one or a plurality of web sites; and/or v) audio items downloaded from, captured, or otherwise obtained from, a broadcasted signal such as a transmission from an FM station or satellite.

Where not clearly and unambiguously inconsistent with the specific context, the above terms as defined above and as they may be more broadly defined below are to be given the broadest possible interpretation and not be limited in scope by any example. While a particular feature may be detailed with respect to a specified example or application, it is intended that the teachings herein be applied broadly and harmoniously across the many possible uses.

Accordingly, it is an object to communicate a user's information preferences to an information provider; receive, from the information provider, informational items that are responsive to the user's information preferences; interleave and sequence, for the user, a playing of the received informational items with a playing of a plurality of musical items included in an audio library of the user; and play, for the user and responsive to the interleaving and sequencing, the received informational items within a playing of the plurality of musical items.

It is also an object to integrate informational items obtained from a radio broadcast with a playing of musical items obtained from a user's audio library.

It is also an object to incorporate a playing of audios obtained from a source other than the user's audio library, that are responsive to the user's music preferences, and that may be added, by the user, to the user's audio library.

It is also an object that an addition of an audio to a user's audio library be at no expense to the user, for a fee, or for such other consideration as may be required by a provider. Such consideration including, for example, the verified apparent listening or actual rejection of a targeted advertisement.

It is also an object to suspend a playing of information that would otherwise be responsive to a user's information preferences.

It is also an object that the radio-on-demand be immediately responsive to a user activating a play control corresponding to a specific information preference.

It is also an object to combine musical audio content with informational audio content and/or atmospherically audio content to provide a multi-layered audio.

It is also an object to prepare a transcript of each radio-on-demand session which may be utilized to replay the session, to edit the session and/or playlist, and/or utilized in a word processor for purposes which may not be related to the playing of audio, e.g., research on a topic.

It is also an object to provide radio-on-demand that also integrates a contemporaneous playing of user selected broadcasted programs.

It is also an object to integrate radio-on-demand with a receipt of a communication unrelated to the radio-on-demand.

Further, notwithstanding, the title and general focus of the disclosure, it is also a particular object of the inventions to enable the downloading of audio and/or information responsive to a user's information preferences from a remote source and in due course to a portable device for subsequent playing.

Briefly, these and other objects are enabled by, for example, an apparatus capable of, and a method of, playing audio, the apparatus comprising communicating, processing, and playing means for, and the method comprising the steps of: communicating a user's information preferences to an information provider; receiving, from the information provider, informational items that are responsive to the user's information references; interleaving and sequencing, for the user, a playing of the received informational items with a playing of a plurality of musical items included in an audio library of the user; and playing, for the user and responsive to the interleaving and sequencing, the received informational items within a playing of the plurality of musical items; and wherein the playing comprises a voice synthesizing of an at least one of informational item; wherein the playing is responsive to a schedule preferences of the user; wherein a verified apparent listening of a playing of an informational item is associated with a credit; and/or wherein a user's reception of a communication unrelated to the informational items is integrated within a playing of musical items.

These and other features, advantages, and objects, are apparent in the context of the detailed description, accompanying drawings, and appended claims, that follow.

DESCRIPTION OF THE PREFERRED EMBODIMENTS

Figure 1:
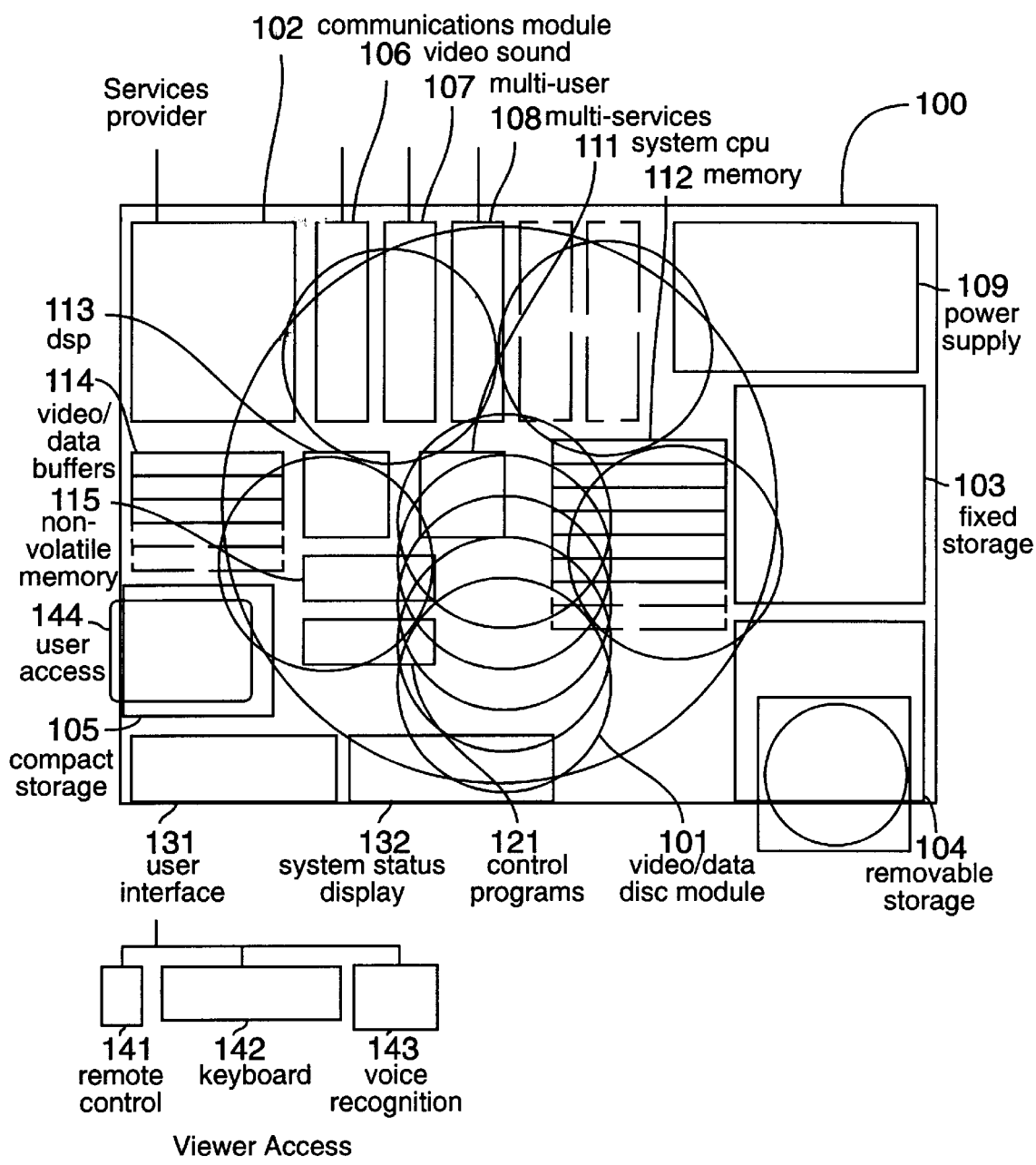
FIG. 1 is a schematic diagram of a Multimedia Player capable of radio-on-demand.

The following are incorporated by reference herein: i) U.S. Pat. No. 5,434,678, titled "Seamless Transmission Of Non-Sequential Video Segments" and U.S. Pat. No. 5,684,918, titled "System For Integrating Video And Communications" issued to Abecassis; ii) the capabilities, features, objects, and teachings of the "MusicMatch Jukebox" personal jukebox software program version 4.2 published by MusicMatch, Inc. and which was available during Sep. 28, 1999 at http://www.musicmatch.com, and related materials; the "REALPLAYER G2" and "REALJUKEBOX" software programs published by RealNetworks, Inc. and which were available during Oct. 6, 1999 at http://www.real.com, and related materials; iii) the capabilities, features, objects, and teachings of Diamond Multimedia Systems, Inc.'s RIO 500 portable digital audio player; iv) U.S. patents: U.S. Pat. No. 4,788,675 titled "Music Delivery System"; U.S. Pat. No. 5,524,051 titled "Method And System For Audio Information Dissemination Using Various Modes Of Transmission"; U.S. Pat. No. 5,539,635 titled "Radio Station Program Identifier And Distribution System"; U.S. Pat. No. 5,557,541 titled "Apparatus For Distributing Subscription And On-Demand Audio Programming"; U.S. Pat. No. 5,675,575 titled "Method And Apparatus For Communicating Different Types Of Data In A Data Stream"; U.S. Pat. No. 5,742,893 titled "Music-Playing System For A Motor Vehicle"; and U.S. Pat. No. 5,809,246 Titled "Selection And Retrieval Of Music From A Digital Database"; v) U.S. Pat. No. 5,299,125 titled "Natural Language Processing System And Method For Parsing A Plurality Of Input Symbol Sequences Into Syntactically Or Pragmatically Correct Word Messages"; U.S. Pat. No. 5,781,886 titled "Voice Response Apparatus; and U.S. Pat. No. 5,940,797 titled "Speech Synthesis Method Utilizing Auxiliary Information, Medium Recorded Thereon The Method And Apparatus Utilizing The Method"; and vi) U.S. Pat. No. 5,231,661 titled "Television Viewing Control Device And Method".

Apparatuses for integrating audio items from an audio library of a user with information that is responsive to the user's information preferences include, for example, multimedia multi-source players ("Multimedia Players"). A Multimedia Player can comprise, for example, synergistic combinations of the functions, capabilities, and components found in consumer electronic systems including a DVD player (e.g. PIONEER's DVL-909 DVD/LD Player), a game system (e.g. SONY's PLAYSTATION II), a net surfboard (e.g. PHILIPS MAGNAVOX INTERNET TV TERMINAL), a direct broadcast satellite ("DBS") receiver (e.g. SONY's SAS-AD3 DIGITAL SATELLITE SYSTEM), a multimedia computing device (e.g. GATEWAY's DESTINATION DIGITAL MEDIA COMPUTER); a nonlinear editing system (e.g. AVID's MEDIA COMPOSER 9000); a set-top box capable of retrieving video-on-demand services from a remote video services provider (e.g. SCIENTIFIC-ATLANTA's EXPLORER 2000 digital set-top); and a digital audio player (e.g., the RIO 500 portable digital audio player); and the teachings of which are incorporated by reference herein.

Various configurations of Multimedia Players permit a user to obtain audio, videos, multimedia, and/or other content from storage means or sources within the Multimedia Player, sources locally accessible, and/or from remote sources.

FIG. 1 is a schematic diagram of a fully featured Multimedia Player 100 comprising the following primary modules and subsystems: i) random access multi-disc module (e.g. a multi-disc DVD read/write drive) 101; ii) communications module 102; iii) fixed storage subsystem 103; iv) removable storage subsystem 104; v) compact portable storage subsystem 105; vi) external video/audio input/output support module 106; vii) multi-user modules 107; and viii) multi-services modules 108.

The random access multi-disc module 101 refers to any nonvolatile memory storage device principally utilized to randomly read/write and store significant quantities of information on a laser readable disc, preferably a multi-session rewritable disc.

In MP3 format a song averages approximately 2–3 MB, thus a single sided, double layered DVD could store approximately 3,000 songs. Even with higher audio quality requirements, forthcoming optical technology will provide discs with the potential to store even larger audio libraries. Thus a single laser readable disc could store a user's entire audio library. Similarly, hard disk drives with over 10 GB are now available at mass market price points, and thus they could also store a typical user's entire audio library.

The communications module 102 may be as simple as a modem card or device, or as sophisticated as may be required by a direct fiber optic access to a remote audio and communication services provider. The communications module may support a plurality and variety of cabling connections such as fiber optic cable, coaxial cable, and twisted pair copper wire, and the cabling required to access a variety of networks. Additionally, the communications module may support a plurality of broadcasts and pointcast audio and information delivery systems. In this fashion by merely depressing the appropriate keys in a remote control device a user can easily switch between off the air transmissions and on-line services. A Multimedia Player may be connected to a local receiving means such as an indoor antenna, an outdoor antenna, or an existing system, such as the electrical system, that may serve as an antenna.

The fixed storage subsystem 103 refers to any nonvolatile memory storage device principally utilized to randomly read/write and store significant quantities of information. An example of a fixed storage subsystem is a magnetic disk drive commonly found in a personal computer.

The removable storage subsystem 104 refers to any nonvolatile memory storage device that utilizes removable media. Examples of removable media for these storage subsystems are personal computer floppy disks, micro disks, tapes, and removable hard disks. The random access multi-disc module 101 is another example of a removable storage subsystem.

The compact portable storage subsystem 105 and user access media 144 is principally distinguished from a removable storage subsystem 104 by the size of the media and the greater variety of memory storage technologies that are generally implemented. However, removable storage media, such as for example a micro disk, are also considered user access media 144. With present technology, user access media is available in dimensions similar to conventional credit cards. Examples of other removable storage media and user access media are laser read/write cards, in which at least one surface of the card permits a laser to read/write information; electronic cards, in which the information is stored in electronic components; solid-state memory products such as CompactFlash, SmartMedia, SanDisk (SD) Memory, Memory Stick; magnetic cards embodying magnetic storage technology, of which a credit card is an example, electronic cartridges commonly utilized in electronic video game systems, smart cards, and PCMCIA cards.

Clearly, a variety of memory devices are available utilizing technologies and combinations of technologies to suit particular performance requirements. The above classifications of the memory devices are directed at bringing attention to functional capabilities of a Multimedia Player rather than to a particular technology. The classifications are not intended to restrict a subsystem to a particular classification, limit the selection of subsystems which may be implemented, or to limit the function of the particular subsystem implemented.

It is intended that a full featured Multimedia Player "play" a variety of laser readable discs, such as, DVD-Video, DVD-ROM, DVD-Audio, CDs, photo CDs, in a conventional manner. The wide range of video/data discs that may be accommodated and the various configurations are diagrammatically emphasized in FIG. 1 as the five stacked circles and the five circles inside the representation of the video/data disc unit 101.

The external video/audio input/output support module 106 supports video/audio/data transmission to the primary audio/video display system comprising, for example, a monitor/television, stereo system, and keyboard/voice recognition-response unit. Additionally, the input/output module supports video/audio input from local sources such as for example VCR's, cameras, and videophones. The construction of the external support module follows the conventional practices of consumer electronic products as for example: DVD players, VCRs, and personal computers.

Multi-user modules 107 principally support separate controlled independent access by a plurality of users of the Multimedia Player's resources. The construction of multi-user modules following established networking technologies.

In a preferred embodiment, instead of utilizing one of the Windows, Unix, and/or Linux operating systems, the Multimedia Player can incorporate a small footprint multi-user multi-tasking real-time operating system with a streamlined user interface patterned after, for example, the simpler interface of a DBS receiver. A multi-layer approach to the functionality/complexity of such functions as surfing the net; contact management and email, DVD/Internet hybrid games, applications and services; video editing; multimedia and word processing; and portfolio management and banking, are made available at a streamlined level that provides functionality required by most users at a markedly reduced level of complexity. The interface of the cited Web TV is an example.

Multi-services modules 108 provide a host of services, such as for example residential security, and appliance operation management. The operation of the module being principally a software application running under the operating system implemented. The construction of the particular multi-service module being responsive to the particular application.

The Multimedia Player further comprises computing elements and audio/video processing elements readily found in multimedia devices and video electronic systems such as, for example, and not limitation, microprocessor 111, memory units 112, video processor or digital signal processor 113, video, audio, and data buffers 114, and nonvolatile memory 115.

The video audio module or board 106 and the processor 113 comprise compression-decompression technologies to both retrieve and decompress, and compress and transmit. The compression technologies may include hardware, firmware, software, or any combination of these. One or a plurality of existing and forthcoming video compression methods may be implemented such as: Motion-JPEG, MPEG 1, MPEG 2, Fractals, and Wavelets. It should be appreciated that as more media becomes available in a digitally compressed format from a variety of sources, for example, DBS, DVD, digital camcorders, resident compression capability becomes less necessary.

A Multimedia Player's control programs that manage the Multimedia Player's resources, and the retrieval and processing of data and information, reside in dedicated chips 121. Alternatively, or additionally, control programs are stored in mass memory devices 103 from installed or downloaded software, in removable storage media 104, or in an user access media 144.

A Multimedia Player's user control interface 131 includes communications to the buttons and keys located on the cabinet of the device, and to the associated control devices 141–142–143. The keys, buttons, and switches, conventionally found in consumer electronic systems and deemed advantageous to the operation of the Multimedia Player may also be implemented. The user control interface 131 additionally supports infrared and/or RF remote control units 141 (e.g. numeric control pad, and keyboard with a touchpad); wire connected control units 142 (e.g. cable connected computer keyboard, mouse, and game controller); and a voice recognition unit 143.

The keyboard, similar to a personal computer implementation, facilitates system setup, keyword retrieval, and system functions requiring the entry of alpha characters. Since a preferred configuration of a Multimedia Player comprises significant multimedia capabilities, a keyboard means is advantageous. A keyboard connector used to connect a standard AT keyboard or a dedicated keyboard is supplied. Alternatively, an infrared-based or radio-based keyboard is implemented.

Given the computing and storage capabilities of a Multimedia Player, a voice response subsystem option accommodating at least the few commands, such as play, stop, mute, audio, skip, required to control the basic operations can additionally be provided. The sophistication of the voice recognition capability can be enhanced as the hardware/software configuration of the Multimedia Player advances within mass market price points.

Implemented in the Multimedia Player is a digital system status display subsystem 132, which provides visual feedback and system status information similar to the implementations in VCR and DVD devices.

In general, parts, subassemblies, and components of a Multimedia Player are of conventional characteristics and are freely substituted by like functioning elements and components. For example, and not limitation, while fiber optic-based communications are preferred, copper phone lines and coaxial cable-based communications are considered, albeit less capable, nonetheless, functional equivalents. Additionally, a certain degree of redundancy of components is illustrated in FIG. 1 to schematically show and detail significant functions.

In a preferred embodiment, redundant components in general, and redundant electronic components in particular, are eliminated. For example, while a Multimedia Player may include a removable storage subsystem and a compact memory subsystem, one or the other may be eliminated. In general, where cost effective, components and electronics are designed to serve a combination of functions.

Further, the configuration of the Multimedia Player's various modules, components, and subsystems, are intended to offer flexibility analogous to that found in a personal computer. Specifically with respect to the multi-user capabilities, a Multimedia Player may be configured, for example, with more than one DVD module, whether inside the primary cabinet, in a mating cabinet, and/or a sister cabinet. Various embodiments of Multimedia Players do not include all, or even most, of the means, and/or capabilities detailed herein. The particular configuration of a Multimedia Player is responsive to the particular function or functions desired. A Multimedia Player need not include anything more than is included in a PC equipped with a DVD-ROM drive and a modem, such as the NEC HOME MUSIC STUDIO from Packard Bell NEC's Consumer Division.

In a preferred embodiment of a Multimedia Player, every component and subsystem is added or replaced without resorting to screwdrivers and the need to unplug and plug communications and power cables. The motherboard and cabinet permitting the replacement of, for example, the power supply 109 just as easily as a battery is replaced in a portable personal computer.

Figure 2:
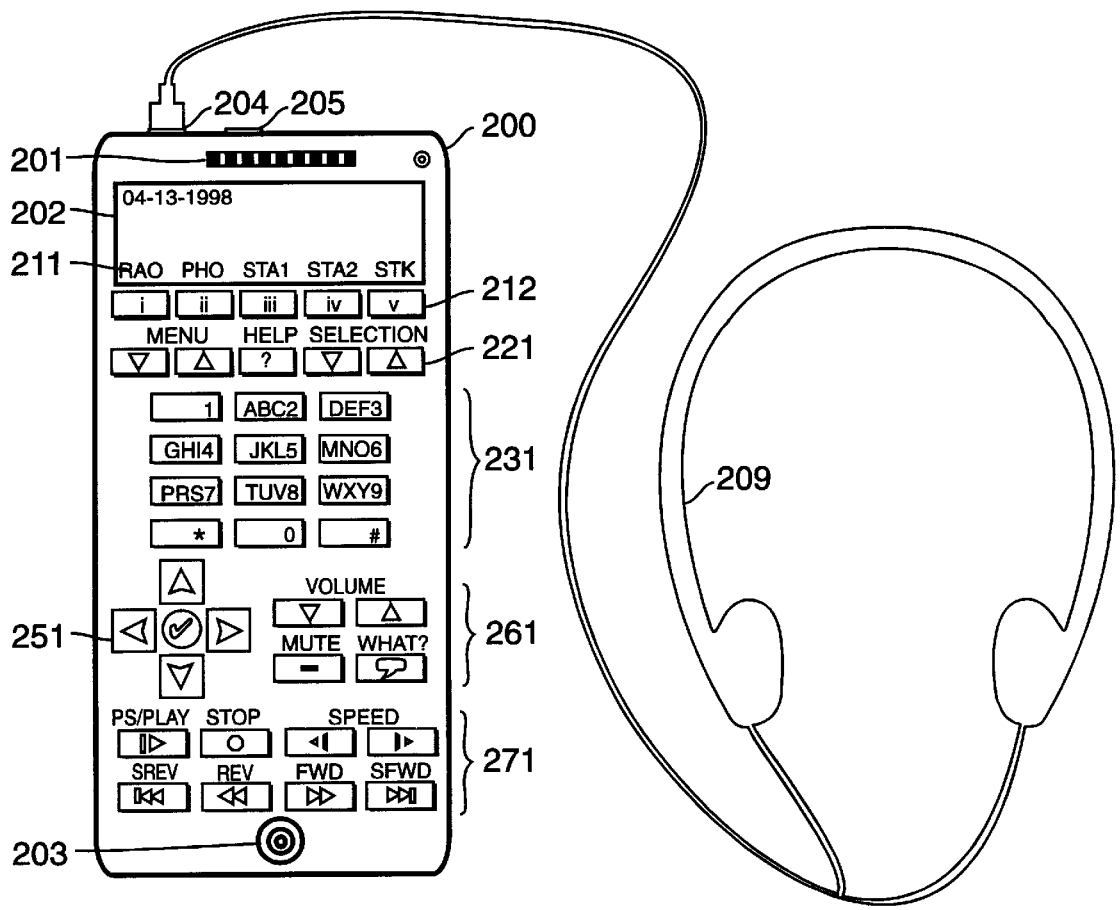
FIG. 2 is a schematic diagram of a portable Multimedia Player capable of radio-on-demand.

FIG. 2 is a second example of a Multimedia Player, in this case, a portable compact digital radio-on-demand player similar to the RIO 500 portable digital audio player.

A portable Multimedia Player 200 comprises for example,: i) a communications module; ii) a fixed storage subsystem; and iii) an audio/data output module. In this example, of a portable Multimedia Player, the communications module supports cellular phone communications, the reception of broadcasted content, and communications with another multimedia player and access to a variety of communication networks; the fixed storage subsystem includes a memory storage principally utilized to randomly read/write and store significant quantities of information, e.g. 128 MB of ram; the audio/data input/output support module supports a built in speaker 201, display screen 202, and microphone 203; audio output connector 204 to provide audio to external speakers or to a personal listening device, e.g., a headphone set 209; and audio input connector 205 to receive audio from, for example, an external microphone.

The portable Multimedia Player's computing elements and audio processing elements include, for example, microprocessor, digital signal processor, and nonvolatile memory.

A portable Multimedia Player's control programs, that manage the retrieval and processing of audio and information, reside in part or in total in dedicated chips, in the fixed storage subsystem, and/or may be received by means of the communications module.

A portable Multimedia Player's user control interface includes the keys, buttons, and switches, conventionally found in portable audio capable consumer electronic products, such as, portable phones, radios, digital audio players, and remote control devices, and/or deemed advantageous to a playing of a radio-on-demand session.

The example of a portable Multimedia Player illustrated in FIG. 2. is shown to include a display screen 202 that labels 211 interactively defined function keys i-v 212 (the set of labels shown includes radio-on-demand RAO, phone PHO, a first pre-set radio station STA1, a second pre-set radio station STA2; and a stock quotation request STK); menu, help, and selections control keys 221; telephonic alphanumeric key pad 231; screen position and controls 251; volume controls (Lower, Higher, Mute) and a What? request keys 261; and play control keys (e.g. Pause/Play) 271.

As configured, the portable Multimedia Player detailed with respect to FIG. 2, is intended to functions as a stand alone cellular phone, as a portable part of multiple-phone configuration, a radio, a remote control, as a digital audio player, and/or as a radio-on-demand player.

Figure 3:
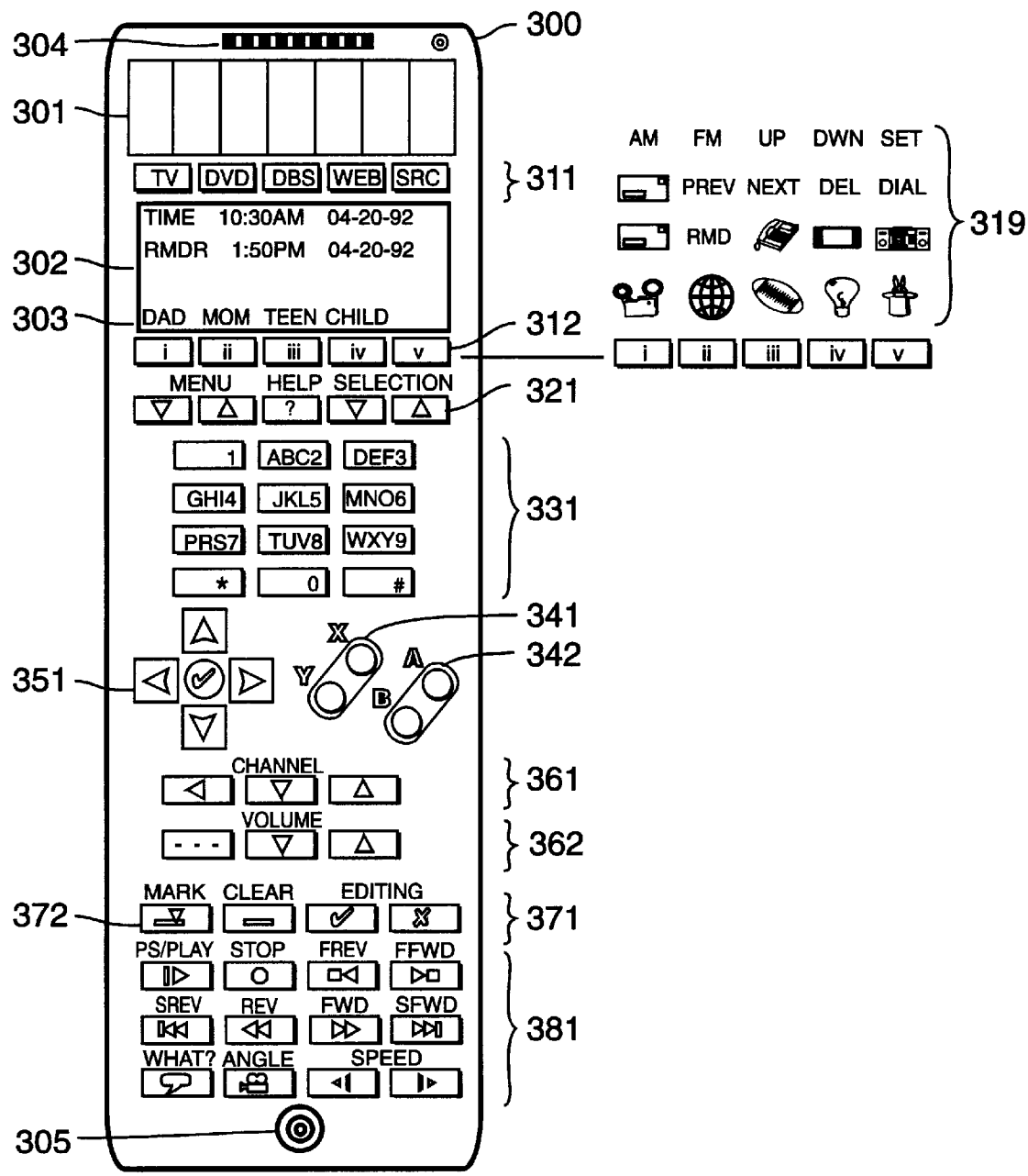
FIG. 3 is an illustration of a remote control device for a Multimedia Player.

A remote control device to control the operation of a Multimedia Payer may be based on any number of technologies both wired and non-wired. For example, detailed with respect to FIG. 3, is a remote control device 300 comprising an optical power panels 301; a display screen 302 that labels 303 interactively defined function keys i-v 312; speaker 304; microphone 305; multimedia source selection/on-off keys (e.g. Broadcast TV, DVD, DVS, WEB, and other sources SRC) 311; menu, help, and selections control keys 321; telephonic alphanumeric key pad 331; gaming controls 341–342; screen position and menu controls 351; channel controls (Last Channel, Up Channel, Down Channel) 361; volume controls (Mute. Lower, Higher) 362; edit controls keys 371; and control keys (e.g. Pause/Play) 381.

The interactively defined and labeled function keys i-v 312 permits a reduced set of function keys to provide access to individual sets of multiple functions for each of a plurality of users, as is suggested by the labels 303. The function keys 312 also provide, for example, subject category selection, program selection, music and information preference selection, and source selection 319. Pressing one of the i-v keys 312 results in an appropriate new menu of labels and/or icons to be displayed 303.

In particular the interactively defined and labeled function keys may be automatically configured and reconfigured by a specific transmission or other information downloaded from, for example, the Multimedia Player. For example, when a specific user accesses the remote control, the display may show blinking icons for voicemail and email received for that individual.

The SFWD and SREV keys in the control key set 381, in particular provide a user access to the functions that utilize the capabilities that are made possible by information relating to the audio. During a playing of a song, for example, pressing the SFWD key causes the termination of the playing of the current song, and the seamless playing of the next logical audio unit. The edit controls keys 371 permit flagging an audio unit during its playing. The exclude key permits automatically excluding, for example, the current song the next time the playlist is played. The include key is utilized to, for example, increase the frequency of, or reposition, an audio unit such as a traffic report. Advanced functions may suspend the playing of a specified information item, e.g. traffic reports, for specified periods, e.g., rest of day.

The MARK key 372 permits the user to define an audio unit. The first time the MARK key is pressed, it identifies the beginning point. The second time the MARK key is pressed, it identifies the end point. The editing keys would then be utilized to code the user defined audio unit. Additionally, interactively defined and labeled function keys; menu, help, and selections control keys; and alphanumeric key pad; can provide access to audio unit coding functions. The MARK key may be utilized to edit the contents of a program, for example cutting out a portion of the program and rescheduling the balance for later playing.

Keys may be labeled, and other keys found in the art may be added responsive to the particular requirements of the functions implemented. For example, shuttle controls may be provided alternatively to, or in addition to, the gaming control shown which can serve the functions provided by the shuttle controls. Other examples are suggested by the remote controls provided with the RCA's RC5200P DVD player, and the MITSUBISHI'S HS-U580 VCR.

Further, the capabilities, functions, keys and other elements of a remote control device may be synergistically integrated with a remote keyboard with integrated touch pad and/or pointing device. In such embodiments, the function keys or dedicated keys, for example, may be configured to provide direct access to the various functions. Further, the remote control device detailed with respect to FIG. 3 comprises all of the components and elements, e.g., a DSP and electronics, required to serve as a standalone portable phone for conventional phone communications, and/or as a communications capable remote control device synergistically integrated with the capabilities of the Multimedia Player. That is, the remote control can also directly receive from the Multimedia Player a transmission and render it audible for the user through its built-in speaker or by means of headphones connected to the remote control as previously detailed with respect to FIG. 2.

Audio, audio information, play routines specific to the audio, and control codes for automatically configuring or controlling the functions of the Multimedia Player may be provided by means of a variety of existing and evolving technologies. In addition to the hard formats such as tape, DVD, optical/magnetic disk, memory chips and modules (e.g. RAM, DRAM, high capacity flash memory, bubble memory), audio content may be provided by soft formats such as may be implemented in a variety of communications networks utilizing for example analog or digital cable transmissions, fiber optic transmission, phone communications, and/or satellite transmissions. A Multimedia Player need not be physically accessible by a user nor be physically located near the audio/video equipment. The Multimedia Player may provide a user access to remote resources and may itself be remotely controlled by the user. Fiber optic and coaxial communications easily permit the required transfer rates over long distances between controllers, Multimedia Players, and other sources. It is within a variety of network-based implementation, that the various advantages and capabilities of radio-on-demand are realized.

Figure 4:
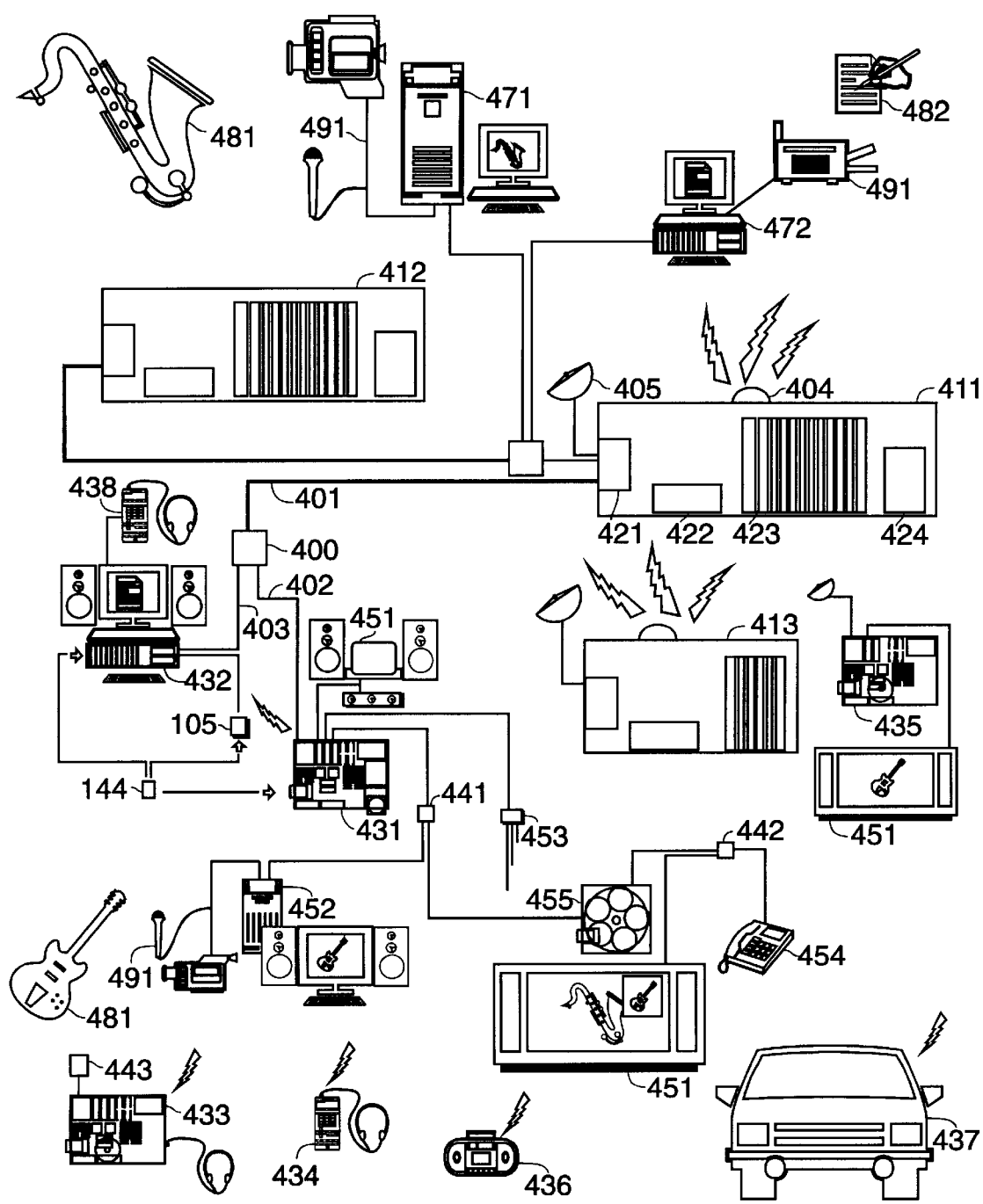
FIG. 4 is a diagram of an integrated communications network.

FIG. 4 is a schematic diagram of an audio and information network comprising a plurality of providers 411–413, and a plurality of end users 431–438. Participants in the network 400, however, whether classified as providers 411–413 or end user 431–438 are both providers and end users of audio, video, and information services. Analogous to a communications network, each participant is able to retrieve and transmit audio and information from any other participant. A radio-on-demand system, in general, and the delivery of radio-on-demand services, in particular, are herein intended to be deployable by a variety of possible networks and Multimedia Player configurations. FIG. 4 show a plurality of wired and non-wired transmission infrastructures that may be implemented, including one or a hybrid combination of fiber optic 401, coaxial cable 402, twisted copper wire 403, microwave, radio 404, and satellite 405 transmissions. Examples of radio-on-demand capable networks are the "video dialtone" model advanced by the Federal Communications Commission, and the internet.

Each participant in the network obtains a hardware configuration consistent with their desire and objectives, and their financial resources. The system of a participant who wishes to serve as a provider 411–413 is functionally equivalent to a capability rich Multimedia Player previously detailed with respect to FIG. 1, differing only in that the respective resources are appropriately scaled and modified to simultaneously access a variety of audio and information resources and commercially service a substantial number of end users. A provider may utilize one or more Multimedia Players 431 in delivering radio-on-demand services.

A radio-on-demand provider system 411, comprises, for example,: i) communications technologies 421 for establishing a plurality of communications streams to a plurality of Multimedia Players 431–438; ii) processing hardware and software 422 for retrieving from a Multimedia Player an end user's music, information, and technical preferences, and for automatically selecting, for each of the participating end users, audio and information that is responsive to the preferences; iii) mass storage random access memory devices 423 for storing one or more music and information databases ("audiobase"); and iv) processing hardware and software 424 for maintaining accounting and support services in connection with services provided.

Providers may be further categorized according to the functions served and/or the extent and character of the audiobase maintained. Central providers 411 may be capable of providing a greater variety of services than for example regional or local providers 413. Regional or local providers 413, however may be the source of local interest services such as are currently broadcast by local radio and TV stations. Other providers 412 may act as "libraries" for specialized categories of audio, as for example an historical archive of government proceedings; or electronic shopping services. The internet architecture and the different classes of web sites are suggestive of the wide range of configurations that are possible.

A user's access to the resources of a provider 411–413 need not be direct. A requested audio may be downloaded, in real time or non-real-time, to a services provider that may be more economically accessible to the intended user. Within the network, some providers may not directly provide any services to users, but act as centralized originators or depositories for other providers.

The particular configuration of a end user's Multimedia Player's random access, storage, memory, processing, and communication means and capabilities are responsive to, but are not necessarily limited by, the minimum requirements of, for example, a particular service provider. A Multimedia Player configuration, such as detailed with respect to FIG. 1, provides the required accessing and storage, processing, and communications architecture required by a network-based remote radio-on-demand provider.

As previously indicated, the Multimedia Player's multi-user and multi-services modules support separate controlled independent access by a plurality of users of the Multimedia Player's processing, and communications resources. In addition to speaker/display systems 451 that may be supported by a Multimedia Player 431, the multi-user module and multi-services module installed also provides services to a personal multimedia computer including a monitor and keyboard 452, security system 453, voice and/or video/voice telephones 454, and a remotely located subsystem 455. In this fashion a Multimedia Player acts as an intermediate provider.

As is shown in FIG. 4, the particular location of a Multimedia Player, subsystems, and/or components are not limited to any particular location, arrangement, and/or configuration. A variety of configurations are possible to meet the various needs an end user. The Multimedia Player detailed with respect to FIG. 2 permits a user to have available a significant number of functions and capabilities irrespective of the user's particular location at any moment in time.

For illustration purposes, some connections between Multimedia Players and output devices are shown in FIG. 4 with lines. However, communications may be established by any of a variety of wired or non-wired means. Thus, a Multimedia Player 431 need not be directly or indirectly connected by wire to other devices. Further, devices may be connected to one of a plurality of communications ports 441–443 which may be communications with a Multimedia Player 431. The communications port may be of varying degrees of intelligence and capabilities, it may serve to boost or manage the signal, or have no other purpose than to serve as a convenient outlet in which to plug and unplug devices.

In an embodiment shown in FIG. 4, a residence may be "wired" or "networked" with convenient ports in a manner analogous to an electrical wiring of a house. In this instance however, a Multimedia Player may be plugged into any of the ports, self configuring the port addresses so that the devices, that may be plugged into other ports, automatically identify themselves and establish communications with the Multimedia Player.

Additionally, Multimedia Player modules may themselves be physically distributed over the network. The plug and play of modules across a network architecture permits, for example, that a DVD module (101 FIG. 1) be physically remote from a Multimedia Player's 431 main unit and plugged on a port 442 near a television/speaker 451. In this instance, the case 455 housing the DVD module also houses a compact storage module (105 FIG. 1). Thus, a single DVD module can be easily moved from one location 442 to another location 441 when physical proximity is required to conveniently replace discs. It is noted that while the disc module case 455 is connected to a first port 442, it would be remotely accessible to a terminal 433 plugged into a second port 443.

It should be appreciated that the Multimedia Player's core components may be located anywhere inside or outside a residence. Specially, where a Multimedia Player includes fans and disk drives, the top of the TV set would not be an ideal location.

As suggested earlier, an object of FIG. 4 is to convey the concept that an end user's Multimedia Player 431–438 and an audio/video production system 471 and an information production system 472 can both upload and download audio 481 and information 482, captured by a wide variety of devices 491 (e.g., microphones, cameras, scanners, and keyboards), through the network directly to other end users 431–438, editing systems 452/471, and/or to the servers of providers 411–413.

As indicated previously, a Multimedia Player can accommodate a plurality compression and decompression technologies to both retrieve and decompress, and compress and transmit through the network. Preferably, a specific audio originating at a digital camera 491, downloaded to a non-linear editing system 471, transmitted over the network 400 to a server 411 for retransmission over the network 400 to a Multimedia Player 431 will utilize a single compression technology to avoid compounding the effects of artifacts that may be introduced by a particular compression technology. Clearly, where the decompression technology resides completely in software, the audio itself could include within and provide the required decompression software.

The capability to read/write the user preferences from and to an user access media provides a user the means to automatically configure a Multimedia Player that had not previously learned the user's preferences (dumb Multimedia Player). In anticipation of the desire to efficiently utilize a dumb Multimedia Player 432, a user instructs a smart Multimedia Player 431 to download to the user's user access media 144 the desired preferences and audio/information selection routines. To automatically configure the dumb Multimedia Player 432 and retrieve audio/information consistent with the user's preferences and selection criteria, the user provides the prepared user access media 144 to the dumb Multimedia Player 432, or to an accessory device housing a compact portable storage subsystem 105 and in communication with the dumb Multimedia Player 432. The user access media 144 automatically configures the dumb Multimedia Player 432 without necessarily downloading the user's preferences other than to volatile memory. This operation is similar to moving a game cartridge from a first game player to a second game player.

Transporting the user's preferences and selection criteria facilitates the process of automating the retrieval of radio-on-demand services from a provider 411 by the use of any Multimedia Player 431–438 that may be available to a user. In this fashion, for example, a traveling executive can automatically configure a Multimedia Player in a hotel room to play a radio-on-demand session comprising videophone messages, the day's news in a format and for topics preestablished by the executive, within a playing of music that is responsive to the executive's music preferences. The operation being analogous to inserting an access card in a hotel room door.

A similar automated configuration may be performed by means of the networks communications capabilities that may be available to both a dumb Multimedia Player 432 and to a smart Multimedia Player 431. This particular embodiment may or may not include the utilization of an user's access card.

A Multimedia Player 431–432 may also directly download, communicate, or otherwise transfer a user's preferences, selection criteria, audio, and/or a radio-on-demand session to another Multimedia Player 434/438, or a compact portable personal audio device similar to the RIO 500, the teachings, previously incorporated by reference, explain that it "stores up to two hours of digital-quality music and up to 32 hours of spoken audio programs", and that a user can "Access thousands of music and audio files at RioPort.com and over 16,000 hours of Audible.com audio programs. Instantly create, customize and mix your favorite music and audio selections on your PC or Mac for playback on your Rio."

In an vehicle implementation, a Multimedia Player in the vehicle 437 may be self contained and/or accommodate a removable module or device to which a user may download the user's preferences, selection criteria, audio, and/or a radio-on-demand session. Additionally and/or alternatively, the speaker system in the vehicle may be configured to accept the audio output from a portable Multimedia Player, such as the unit detailed with respect to FIG. 2, either by means of a cable or by direct insertion into a built-in docking bay.

Clearly, the field of vehicular audio systems is well developed. Since a vehicle is an ideal platform for radio-on-demand, it is a particular object to synergistically integrate the teachings herein with the elements, components systems, steps, and/or methods shown in vehicular audio systems. For example, the teachings of the previously incorporated '893 patent which shows and is titled "Music-Playing System For A Motor Vehicle" can be modified so that instead of musical pieces being radio communicated on-demand to the vehicle, a radio-on-demand session including interleaved musical pieces and information items is communicated to the vehicle. Additionally, and/or alternatively, the musical pieces in such a system may instead be informational items that are interleaved and sequenced with musical pieces retrieved from a music storage in the vehicle rather than a music storage outside the vehicle.

A user may select to, for example, purchase a plurality of DVD-Audios and store them within a Multimedia Player having the capacity to store and randomly access an entire collection of discs. Other users may prefer to save to a storage in a Multimedia Player only selected audio items, and delete and add individual items as a user's audio preferences change and/or new audio items are obtained. These are example of a physical audio library stored on a storage included within a Multimedia Player that is physically accessible by the user.

Additionally and/or alternatively, a user may prefer to build a virtual audio library or supplement with virtual audio items a physical audio library. An user need not have physical access to the various means that may store the audio items of the user's audio library. In a manner analogous to a book library that contains both physical items and references of other physical items located outside the library, for a musical item to be included in an audio library, all there need be in the audio library is a reference to where such musical item is stored. In other words, a musical item may be incorporated by reference in a library. Virtual audio items may be, for example, those items identified by a URL and retrievable on-demand from a remote web site. Virtual audio items may also be identified by a broadcast time and station or channel.

A virtual audio item may be retrieved at the time of its playing, i.e., retrieved and played in a real-time manner; or retrieved in advance of the time it is to be played, temporarily stored in any of a Multimedia Player' storage means, and erased from memory after being utilized for a single playing of for a plurality of scheduled or projected playings.

Virtual audio items in a user's audio library do not contain the data that actually produces the audible content, rather they contain information, e.g., pointers, to where that data is located. A completely virtual audio library is therefore a database of information relating to audio items. While a physical audio library may not require a database associated with it, there are significant advantages to supplementing in a database the information that may be provided with an audio item. For example, a database facilitates keyword searching and other capabilities available with, for example, the use of SQL. For this purpose a dedicated database package may be implemented, or a broadly available package may be configured, e.g., provided with a schema, query forms, and reports, to serve the requirements of most users. The database may also serve the objects of establishing and maintaining a user's preferences.

Accordingly, where advantageous, an audio library indirectly or directly comprises an audio library database having information for at least some of, each of, other than, and/or more than, the physical and/or virtual audio items in the audio library.

A user's audio library and/or a user's audio library database may also be part of, and be commingled with, a larger audio library and/or database. For example, a household may maintain a single CD library to which each member of the household contributes to and utilizes according to their specific music preferences. A single relational database can serve to maintain the appropriate records.

A user's music preferences, e.g., preferences for audio which is musical in character, may be defined by all of the audio items that a user includes in an audio library. Additionally and/or alternatively, a user's music preferences may be defined by a subset of all of the audio items that a user includes in an audio library. A user's music preferences may be defined broadly with respect to, for example, musical categories (e.g., classical, rock) and/or personal categories, (e.g., mood, tempo, and occasion) and performer classes and/or individuals; and/or specifically with respect to individual audio items. Music preferences may utilize Boolean expressions, e.g., songs from a user's preferred list of individual performers satisfying a user's musical category preferences and personal category preferences. Music preferences may be established by means and methods similar or analogous to the means and methods of the previously incorporated teachings of the MUSICMATCH JUKEBOX and the REALJUKEBOX audio players.

Additionally and/or alternatively, a user's music preferences may be specifically defined by, for example, a user's directly prepared and ordered playlist of audio units selected by the user from the user's audio library. Additionally and/or alternatively, playlist functions such as the MUSIC-MATCH's "AUTODJ" are utilized to create automatic playlists. Among other capabilities, MUSICMATCH's "AUTODJ" function permits a user to enter the length of time for which the user would like the playlist to play, and to select the criteria that the creation of the playlist will be responsive to. Music preferences may also be established by an automated purely random playing of musical items from the user's audio library.

Manual or automated playlist functions may also be responsive to a user's audio library, music preferences, playlist, and/or to rules for playlist creation patterned after the rules that, for example, a professional disc jockey implements in playing selections for a live audience. Preferably, musical items to be included in a playlist are paired and organized to provide an elegant fluidity and transition between items. For example, three slow tunes are followed by a more moderately paced tune, and by two fast paced tunes.

Playlist functions may also be responsive to the time of day, season, particular public or private dates, sign on/off audio items, and information introductions and follow-ups. An example, of the latter is for example, where a report about a particularly good increase in the value of the user's stock portfolio would be followed by a few "we're in the money" bars.

The establishment of a user's music preferences may be constrained by the availability of songs in a personal audio library and/or the songs in a target public or commercial audio library. That is, if the library does not contain classical music, and if the preferencing process is freeform, as for example, by the entry of keywords or by a natural language query, the user is provided an appropriate message during the preferencing process. On the other hand, when the object of the establishment of a user's music preferences includes adding audio items to the user's audio library, and/or the user has access to audio items other than those in a personal audio library, the preferencing need not be constrained.

A user's music preferences may be communicated to a remote library for purposes of downloading, for the user, audio items. Such a method takes advantage of any one or combination of more than one of the previously detailed networks to which the user's particularly configured Multimedia Player may have access to. For example, as in the MusicMatch method, a user may utilize the web to directly access a website to download a user selected audio item. Additionally and/or alternatively, the teachings of, for example, the previously incorporated U.S. Pat. Nos. '675, '051, '575, and '246 may be advantageously adopted to meet particular objectives.

By contrast to a direct audio acquisition method, a Multimedia Player can be configured to automatically acquire audio items. For example, a satellite, cable system, or other broadcast may, advantageously, transmit overnight thousand of audio items, in a compresses non-real-time manner, from which a Multimedia Player could selectively download musical items. In this situation, the Multimedia Player's software may be dependent on obtaining direct information that serves to identify the broadcast time of the various offerings. Providing a broadcast schedule and audio database to which the preestablished user's music preferences could be applied to identify audio items for downloading could be done substantially in advance of a programming cycle, e.g. 1:00 AM each day, or more or less contemporaneously, e.g., in advance of each song transmitted.

Additionally and/or alternatively, the Multimedia Player's music acquisition functions temporarily stores a musical selection for purposes of "listening", i.e., analyze the songs musical characteristics, and determine its potential suitability. For example, if the user's library contains a number of Louis Armstrong selections, music acquisition software "learns" or identifies the particular characteristics present and utilizes them to detect the signature voice as well as the prominence of the trumpet and accompanying instruments in other selections. The music acquisition functions can listen for the presence and/or the absence of musical characteristics. This is particularly advantageous when a user's music preferences require new, contemporary, and/or avant-garde selections. The recursive feature of the music acquisition function allows it to learn from its recommendation "mistakes", identified by, for example, a user terminating the playing of a selection. For these purpose, the user's audio library database maintains a record of the recommendation source (e.g., system, person, service), methodology, and/or criteria utilized. The object is to provide a fully intelligent autoactive audio acquisition system.

The various audio acquisition methods and systems directly detailed herein may also be synergistically integrated with, supplemented by, or replaced by, any of the methods and systems of the U.S. patents previously incorporated by reference.

As previously indicated, information preferences refers, principally, although not exclusively, to preferences for audio which is informational in character, such as the audio that is produced by an AM radio broadcast between the playing of songs. Information preferences refers to, for example, preferences for information relating to the song being played, and/or news, weather, and traffic reports, jokes, quotes, inspirational or motivational messages, advertisements, and/or programming of a non-musical nature.

A user establishes information preferences with respect to, for example, news of interest, in at least one of a plurality of major categories (e.g., stocks, weather, and traffic) and sub categories, and/or specific items. For example, responsive to a user's specific information preferences, stock quotes for the overall indexes and each of the stocks in a user's stock portfolio, may be delivered at specified intervals, at specific period of times, at significant movements, e.g., price, volume, and/or with news stories, reports, filings, and interviews.

Information preferences may be established off-line, and/or online directly with an information provider or with an intermediary. The internet provides extensive models for the establishment of information preferences including, for example, http://www.yahoo.com, http://www.altavista.com, http://auto.search.msn.com, and http://www.nasdaq.com, the teachings of which, as of Oct. 18, 1999, are incorporated by reference herein.

Preferably, although not necessarily, radio-on-demand utilizes at least one dedicated information provider whose information services are specifically designed to be supportive of radio-on-demand information requirements. With such a provider, a user may also be able to pre-establish information and scheduling preferences to enable the provider to search out and/or prepare informational items required by the user in advance of the user actual request for the information. Further, such a provider may also maintain a database recording what informational items a user has actually been provided and/or listened to, to avoid duplicating information provided, and to enhance the user's preferences profile. Still further, by analyzing the requirements of a plurality of users, a provider may desire to allocate information gathering resources to more closely match the interests of the users.

Additionally and/or alternatively, radio-on-demand may also utilize one or more generalized information providers, such as YAHOO! or a radio based information provider, whose information services may be synergistically and transparently integrated to support radio-on-demand information requirements.

Preferences can also be established to exclude content from being selected, retrieved, or made audible. Music preferences and information preferences may also be established with respect to, for example, content categories of possibly suitable or unsuitable content, descriptors, codes, ratings, flags, and/or keywords. The existing art, including the '678 and '918 patents previously incorporated by reference, offers a variety of coding schemes that may be implemented alone or in combination to meet particular objectives.

Accordingly, such music and information preferences require that audio units and information be, for example, categorized, described, coded, rated, flagged, keyworded and/or analyzable to permit retrievals that are responsive to a great variety of user preferences. Additionally, audio units may be mapped and the various audio units may be specifically categorized, described, coded, rated, flagged, and/or keyworded. While mapping audio content that is of 2–4 minute duration, e.g. a song, may not be generally as useful as the mapping of a full length motion picture, there are nonetheless instances where such mapping is advantageous. For example, identifying the audio unit most representative of a song can serve to quickly organize and pre-listen to a playlist, specially when the "listening" is to be carried out by a software agent.

As previously indicated, technical preferences comprise, for example, a preference for the relative volume and speed of the different categories of information, and the voice to be utilized in the synthesizing of information. For example, a voice imitating the president's voice may be utilized to deliver the weather information, while the voice of the user's mother may be utilized to deliver traffic reports. A user may prefer that advertisements be delivered at a 20% lower volume than the volume selected for musical content, and at a 10% faster rate that a real-time rate.

In general, preferences may be established individually, in combinations, and/or as specified by logical Boolean operators (e.g. AND, OR, NOT, AND, NEAR) and may be applied across the different categories and classes of music, information, schedule, and technical preferences. For example, certain technical preferences may be applied in the playing of music, and a different set of technical preferences may be applied in playing of stock quotes.

Once information preferences have been established, radio-on-demand need not require anything more of a user than turning on the service, e.g., running the software program. Radio-on-demand is designed to automatically produce a continuous playing of audio responsive to the preestablished music and information preferences without a need for the user to intervene.

However, radio-on-demand also supports a high level of interactivity which may be utilized to, for example,: i) skip past an audio, e.g., a song, show, or information audio unit (e.g. Skip Forward); ii) replay an audio or segment of an audio (e.g., What?); iii) obtain additional details and supplementary information on an audio (e.g. More!); and/or iv) request information.

As was illustrated with respect to FIG. 2, a key 212 may be activated by a user to cause the Multimedia player to obtain and provide an updating of information, e.g., current stock quotations. To the extent that an information request may require some time to fulfill, sequencing functions provide a message acknowledging the request, a time that such request may be fulfilled, and continue with the previously scheduled radio-on-demand session until the requested information can be made audible.

Interactivity also permits radio-on-demand functions to refine the user's music and information preferences. For example, if a user's causes a premature termination of the playing of a song, the playlist is updated accordingly, either eliminating the song from the playlist, or assigning to it a lower preference or incidence rating. The up arrow and down arrow keys of screen position and control key set 251 enable the user to express a like or dislike for an item.

Generally, the design of a user's music and information preferences eliciting routines and user interfaces are responsive to the particular descriptive structure that was implemented in analyzing the content of the audio and the information.

Figure 5:
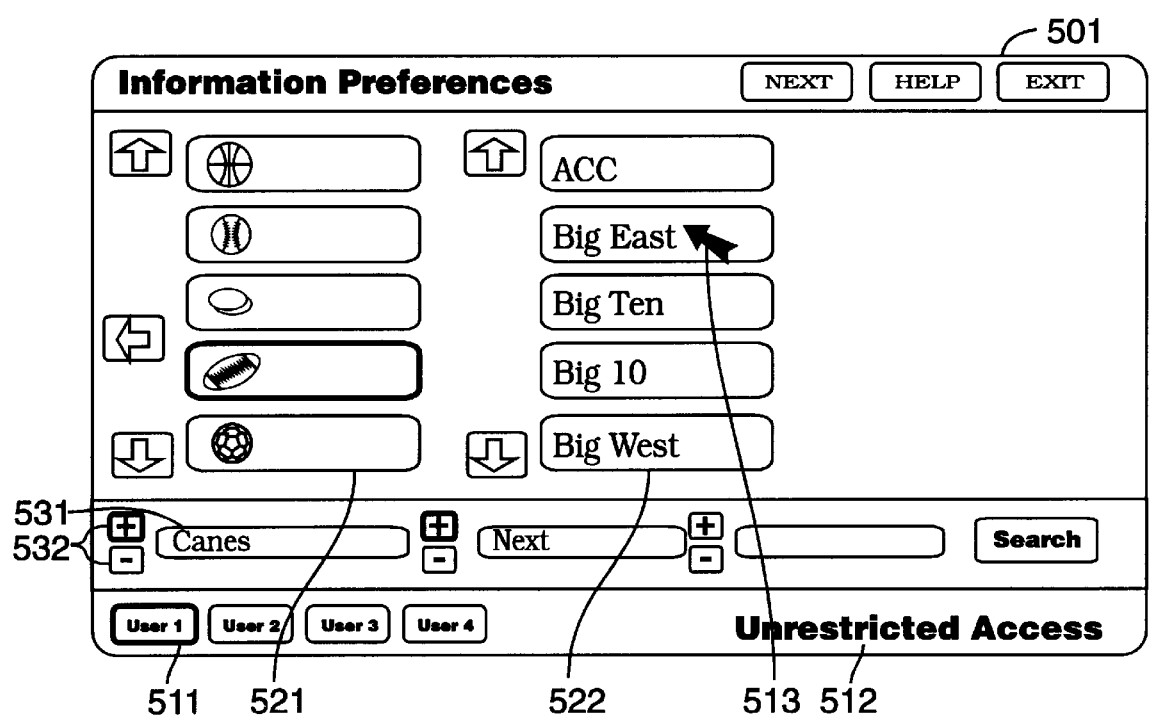
FIGS. 5 and 6 are illustrations of a graphical user interface to enable a user to establish preferences.
Figure 6:
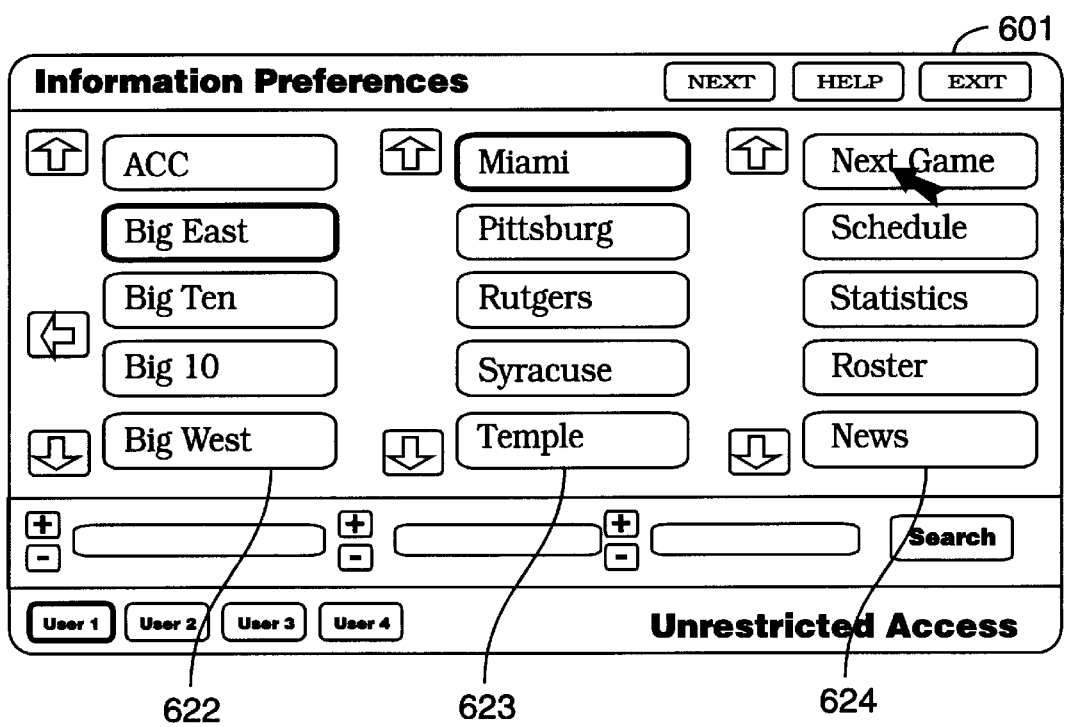

FIGS. 5 and 6 illustrate an example of an information preferencing screen 501/601. In this particular embodiment, the information preferencing routines have established which user 511 of a plurality of users has gained access to the system and have caused a display of a message relating to the access permissions 512 for the user 511. In this example, user 511 has unrestricted access to the information preferences routines.

Each screen displays up to three sets 521–522/622–624 of linked scrolling buttons each individually selectable by means of a pointing device, e.g., a mouse and associated graphics 513. In the illustrated example, a user is interested in being kept updated with respect to information relating to the next game that the University of Miami college football team will play. One method of establishing the information preference is to cascade through the options 521, 522, 623, 624 which are displayed responsive to the user selection. Alternatively, the user could utilize the keyword search capability 531. Still alternatively, the user could utilize a combination 532 of the predefined categories 521–522 and a keyword search 531.

Clearly, a great many preferencing GUIs may be implemented. For example, preferencing screens may be patterned after the books and pages of the MUSICMATCH help system previously incorporated by reference. Further, a preferencing means need not be based on the utilization of a GUI and/or a pointing device. A preferencing means that is entirely operated by a speech recognition and voice response system is particularly advantageous in, for example, a portable radio-on-demand apparatus and an vehicle implementation.

Once established, a user's preferences may be stored in a nonvolatile resident memory, in the memory of the fixed or removable storage subsystem, a user's optical read/write access card or electronic memory card, or from a read/write video/data disc. Storing a user's music and information preferences in a portable means facilitates autoconfiguring a radio-on-demand capable apparatus.

Figure 7:
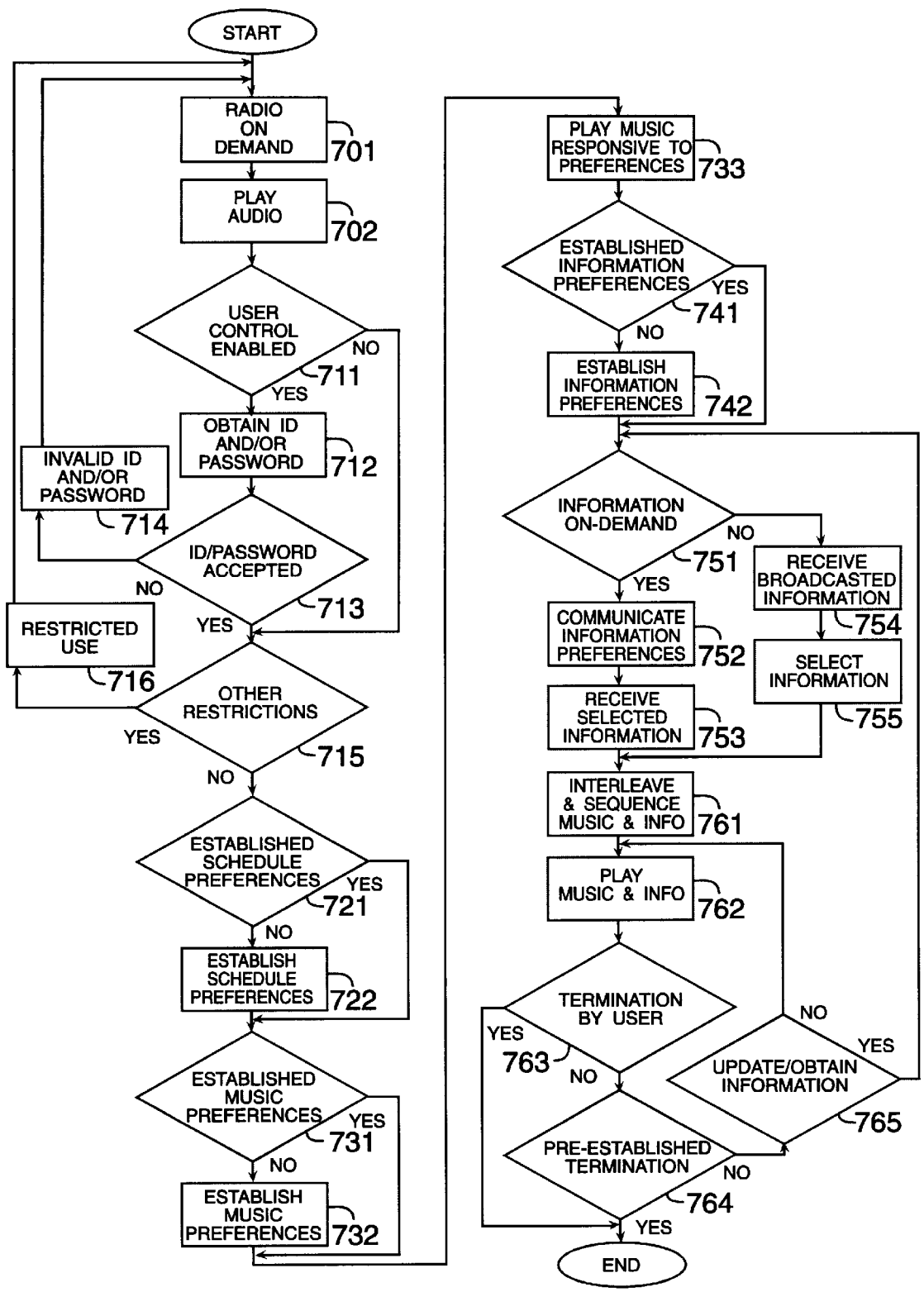
FIG. 7 is a flow chart detailing the steps of playing radio-on-demand.

A method of playing radio-on-demand is principally detailed with respect to the flow chart of FIG. 7. Upon selection of the play function or turning on the apparatus, as in, for example, a dedicated apparatus, software, firmware, and/or hardware processing capabilities begin a radio-on-demand session 701 with the object of instantaneously playing an audio 702 in response to a reception of a start/play command 701. The selection of, for example, an audio unit 702 from the user's audio library can be arbitrary, random, or in response to a preestablished preference, procedure, or by utilizing a previously identified audio item.

The playing of a first audio item 702 can serve as background audio to, or be an integral element of, for example, the user access control routines which begin by issuing a command to read the user control setup to ascertain if user control is enabled 711. If enabled, the handshaking routines request user identification and, if required, a corresponding password 712. If the user identification and password are not found acceptable 713, the appropriate error message is provided 714, and the apparatus is returned to a state prior to the user play request 701. A first audio item 702 can comprise an audio requesting voice identification 712.

If user identification and password are found acceptable 713, other restrictions 715 to a user access are checked. These additional restrictions include, for example, time of day restrictions and/or accumulated usage during specified time frames. If restrictions are enabled that prevent usage 715, an appropriate error message 716 is provided, and the apparatus is returned to a state prior to the user play request 701.

The user-permission capability enables a parent to have complete control over the use of the apparatus, and provides for multiple individualized preferences. U.S. patent '661, previously incorporated by reference, details "a device and method for controlling television usage by children and other users", which can be similarly implemented.

As is shown in FIG. 7, time and other restrictions 715 may operate independently of user control functions 711 in, for example, those instances where restrictions in the operation of the apparatus do not differentiate between users.

If user control is not enabled 711, or if enabled and verification of the user 713 and verification of other restrictions permit usage 715, the radio-on-demand initialization routines continue with, in this example, the scheduling preferencing routines 721.

If it is determined that schedule preferences have been preestablished 721 and they are not to be modified, or are not required, then initialization proceeds with the music preferencing routines 731. If the schedule preferences have not been preestablished and are required, or they are to be modified 721, then initialization proceeds with enabling the routines required to establish schedule preferences 722.

Whether preestablished or contemporaneously established with a particular session, the schedule preferences can be as simple as, for example, enabling a user to specify the duration of the radio-on-demand session. Schedule preferences can also be as detailed as, for example, specifying a time at which specified types, classes, or items of information (e.g., stock market reports) are provided, and the relative mix of specified types, classes, or items of music and information. Schedule preferences may also be responsive to a personal or publicly significant time of day, day of the week, month, year, special occasions, and/or to the schedules, reminders, entries, or other information in a user's contact manager database.

If it is determined that music preferences have been preestablished 731 and they are not to be modified, then initialization proceeds with a playing of audio that is responsive to the music preferences 733. If the music preferences have not been preestablished 731, or they are to be modified, then initialization proceeds with enabling the routines required to establish music preferences 732, followed by a playing of audio that is responsive to the music preferences 733.

If it is determined that information preferences have been preestablished 741 and they are not to be modified, then initialization proceeds with the routines required to obtain information 751. If the information preferences have not been preestablished 741, or they are to be modified, then initialization proceeds with enabling the routines required to establish information preferences 742.

If the transmission of the information can be responsive to the information preferences, i.e., on-demand 751, then the information preferences and/or the required information are communicated to the information provider 752, and the information that is selected in response to the information preferences and/or the required information is received 753. Otherwise, for example, broadcasted information is received 754, to which the information preferences may be applied to select only the appropriate information 755. A radio-on-demand session need do nothing more than substitute a user's preferred musical items for the broadcasted musical items, buffering for a sequenced replay some or all of the informational items being broadcasted.

Radio-on-demand is advantageously and significantly distinguished by the step of interleaving and sequencing of audio and information 761 to seamlessly and audibly play 762 information within a playing of musical items that are responsive to a user's music preferences.

Generally, herein, interleaving and/or alternating means to arrange a playing of an information item to be in-between a playing of two musical items. For example, a radio-on-demand session responsive to a user's music, information, technical, and schedule preferences, interleaves audio and information by beginning with musical items 1 and 2 from a user's CD, and following with synthesized stocks reports from data transmitted by a radio-based service, musical item 3, 4, and 5 from a web site, synthesized news relating to DVD-hardware from YAHOO! news service, a reminder from a contact manager to prepare for a meeting, and the local weather extracted from a television scheduled broadcast, and ending with a ten minute audio segment from a scheduled broadcasted radio program.

Generally, herein, sequencing, synchronizing, coordinating, and/or harmonizing a playing of two audio items means that the end of an audio item is arranged to be followed by a beginning of a next audio item without a significant delay. Examples of a sequencing of two audio items are the arrangement of music performed by a disc jockey at a party and the arrangement of programming conducted by radio station producer. The MUSICMATCH audio player program, for example, automatically sequences a playing of a plurality of songs responsive to a playlist. As is shown by the examples, to seamlessly play sequenced audio and information 761 may require the advance retrieval and temporarily buffering of items until required to be inserted at the appropriate time. Any of the memory and/or storage means available in a Multimedia Player could be utilized for a temporary buffering.

Where advantageous, a sequencing prematurely ends or interrupts a playing of an audio item to play another audio item. For example, information deemed to be of high priority by a user may interrupt "scheduled" programming, and for example, be looped until the user acknowledges reception of the communication. Where the radio-on-demand functions are synergistically sequenced with communications such as voice, fax, and email, a playing of, for example, a musical item may be interrupted by a telephone call but not by a recorded phone message. Responsive to a user preference, a recorded message would be sequenced to be played at the conclusion of the musical item and before the next previously scheduled audio item.

On exception, an interleaving and sequencing also means combining musical content and informational content to produce, in real-time, a multi-layered audio. A musical item may be advantageously and intentionally played at a lower than normal volume to provide a background to a simultaneous playing of an informational item. For example, an inspirational or motivational sentence may be played within a playing of an instrumental recording. For these purposes, tracks may be selectively utilized from a multi-track audio, i.e., the vocal track(s) may be dropped or its volume lowered while the instrumental track are utilized as a background for an informational item. Multi-layering of audio may be responsive to user and/or system preferences. Alternatively, the producer of the item may include with the item producer preferences that are applied during the playing of the item.

As is illustrated, the steps of obtaining information 751–755, and/or alternating and coordinated musical and informational items 761, may be repeated any number of times 765, and while maintaining a seamless playing of musical and informational items 762.

The playing of radio-on-demand may be ended by a user direct termination 763 (e.g., turning off or disconnecting the playing), or by a preestablished termination time or event 764 (e.g., specified time of day, length or duration of playing, when a specified audio item is played, responsive to any scheduling preference, or schedule).

A Multimedia Player capable of playing radio-on-demand comprises, for example, a modem for communicating a user's previously established information preferences to an internet-based information provider, and for receiving information that is responsive to the user's information preferences; a processor for interleaving and sequencing, for the user, a playing of the received information with a playing of a plurality of musical items included in an audio library of the user; and such electronic components and random access storage as may be required for a playing, for the user, the received information interleaved within, and sequenced with, a playing of the plurality of musical items.

In a Multimedia Player without built-in means for directly making the information and musical items audible, the term "playing" is to be understood as meaning, for example, providing what may be required for an external speaker(s), head set, and/or other Multimedia Player to make the information and musical items audible to a user.

Figure 8:
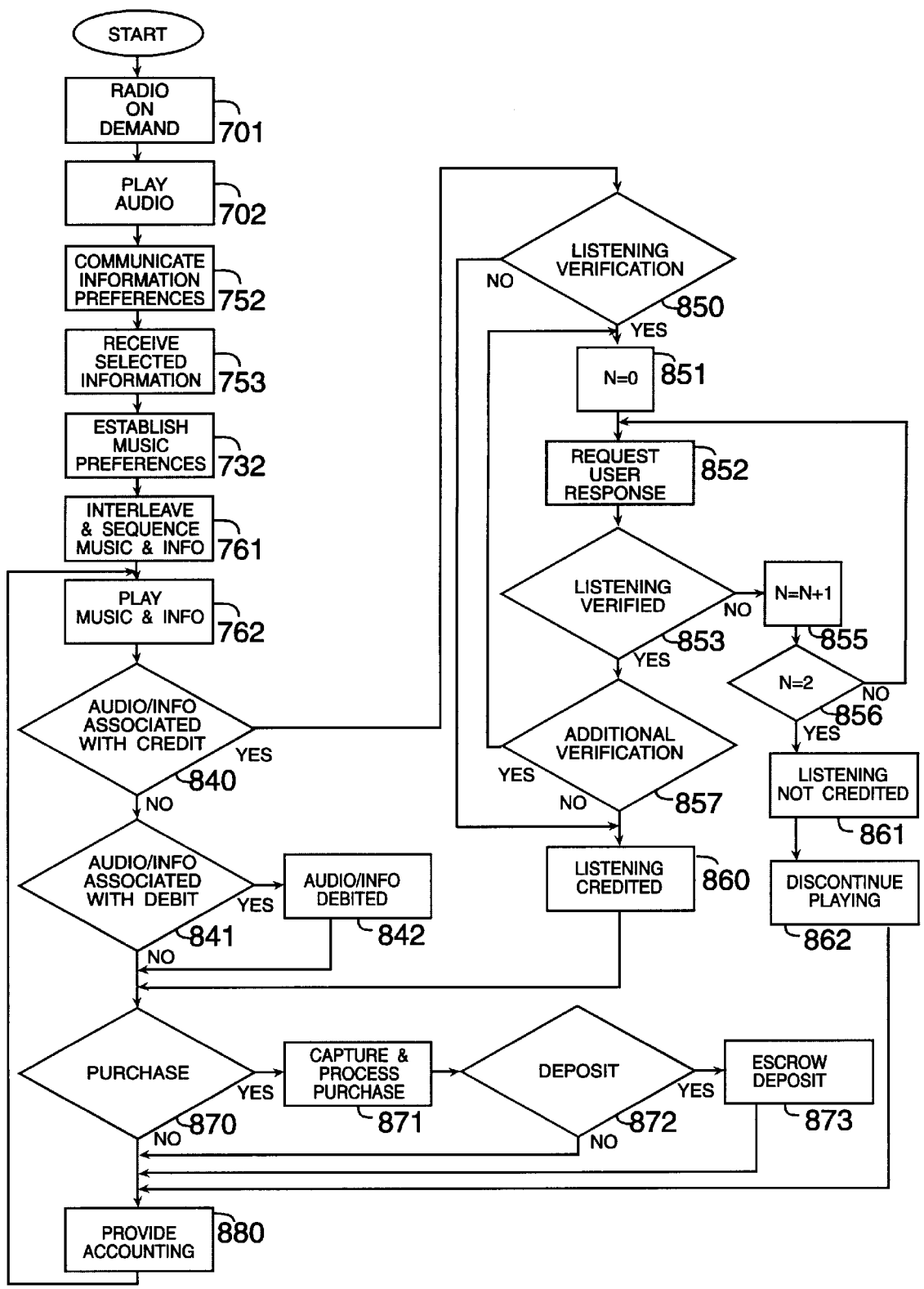
FIG. 8 is a flow chart detailing the steps of playing radio-on-demand and of verifying and crediting an apparent listening of audio/info item.

In the method detailed with respect to FIG. 7 many steps may be omitted, modified, supplemented, and/or rearranged and additional steps may be incorporated to suit particular objectives and implementations. FIG. 8, illustrates an example of an alternative embodiment which may be included as one option of a range of user selectable methodologies, or be the only methodology utilized by a particular device.

In this particular embodiment, upon selection of the play function or turning on the apparatus, software, firmware, and/or hardware processing capabilities begin a radio-on-demand session 701 by playing audio 702 from the use's audio library. Contemporaneously, the information preferences are communicated to an information provider 752. Next, information is received 753 that is responsive to the information preferences.

Contemporaneously with the communicating of the information preferences, radio-on-demand functions automatically generate a random playlist of the musical items present in the user's audio library 732, and may begin in advance of receiving information with a playing of musical items according to the playlist. Upon reception of information, the interleaving and sequencing 761 of the playing of the selected musical items and the received information is followed by seamlessly and audibly playing 762 of the received information within a playing of the musical items that are physically included in the user's audio library.

By contrast to the previous example, in this case, a radio-on-demand session may begin with musical items 1 and 2 retrieved from the hard disk of the user's Multimedia Player, and be seamlessly followed by synthesized stocks reports from data obtained from a web-based information provider, musical item 3 from a CD inserted in the user's Multimedia Player, and synthesized news relating to DVD-hardware obtained from YAHOO! news service.

An advantageously significant element of the inventions herein is the synergistic integration of a playing of content that is in an audible format (e.g. songs from a CD) with content that is not in an audible format and which is made playable by a voice synthesizing (e.g., information that is received, retrieved, downloaded, or otherwise obtained in the form of digital data representing ASCII characters). U.S.

patents '125, '886, and '797, previously incorporated by reference, as well as the references cited therein, show a variety of methods and means for synthesizing information. Radio-on-demand provides a significant service to the visually handicapped as well as to individuals that desire to multitask.

The method detailed with respect to FIG. 8 is to this point more streamlined than the embodiment detailed with respect to FIG. 7. However, by contrast to the embodiment detailed with respect to FIG. 7, the method of FIG. 8 also adds the steps of crediting or debiting the listening of audio, e.g., information, provided to the user.

If an audio is associated with a credit 840, as may be case with a listening of an information item such as an advertisement, a listening verification routine 850 may be enabled. Otherwise the listening of the audio is presumed and the listening of the audio is credited 860.

If a user verification routine is enabled 850, at a point in the playing of the audio, a request 852 is made of the user requiring that the user respond by any one of the user access means that may be implemented in the user's apparatus. The request may be as simple as an audible request to press the play button in a remote control unit. A variety of other active and passive means may be implemented that establish a user's presence during the listening of the advertisement 853.

Once the listening of the advertisement is verified 853, the listening of the audio is credited to the user's account 860 in due course. If during a specified time the user fails to respond to the listening verification 853, the user's account is not credited with the listening of the audio 861. Further playing may be continued or discontinued 862.

If a first audio listening verification fails 853, listening verification may be repeated. As illustrated, a simple counting routine 851/855/856 is set up, for example, to repeat at least once, the user response request 852.

Audio listening verification may require a plurality of user response requests 852 prior to crediting the listening of the audio 860. In instances, where additional verification is required 857, user verification is repeated.

The playing of an audio need not have been interrupted during the listening verification. It should also be noted that listening verification can occur during the playing of an audio item, and/or at the conclusion of the playing of the audio item.

If an audio is associated with a debit 841, the playing of the audio is debited from the user's account 842. The debiting of the listening of the audio may incorporate the audio listening verification routine above detailed with respect to the crediting of a listening of an audio. That is, the debiting of an audio to a user account is responsive to an appropriate user response to a verification request. As in the credit situation, if the listening verification fails, further playing of the audio may be terminated. In both a credit situation and a debit situation, if playing of the audio is terminated, where advantageous, e.g., a lengthy presentation, a record is retained of the point of termination, so that the audio, upon user request, may be continued from the point of termination.

In instances where the listening of the audio results in the user executing a purchase 870, purchase information is captured and processed 871. If a deposit is associated with the purchase 872, the deposit is escrowed 873.

Where a purchase occurs prior to an audio listening verification, the purchase constitutes effective listening verification, and therefore, further user verification may be omitted.

At an appropriate point in the session, the user is provided with an accounting 880 of the crediting or non-crediting of the listening of the audio.

Thus while the method detailed with respect to FIG. 8 is simpler, in terms of the preferencing, than the method detailed with respect to FIG. 7, it incorporates additional steps that advantageously advance the subsidizing of the radio-on-demand services. It is also noted that FIG. 8 is one example of how the teachings of, in this case, the '918 patent, previously incorporated by reference, are synergistically implemented within a radio-on-demand embodiment.

The method detailed with respect to FIG. 7 can also be supplemented by the steps of recording: i) the radio-on-demand session as it is being played; ii) a transcript of the radio-on-demand session; iii) the schedule of the radio-on-demand session; iv) such minimal information, linkages, and pointers as may be required to duplicate a playing of the radio-on-demand session; and/or v) supplementary information and linkages to additional information relating to items in the radio-on-demand session.

Where advantageous, the recording is provided in a format or may be converted to a format to permit editing with a word processor. For example, a schedule and transcript of a radio-on-demand session includes a time an item is played, a transcript of each informational item, an identification of a musical item, and such passive and active supplementary linkages and pointers as may be potentially useful to a user. A user by means of a word processor could rearrange the relative position of individual items, delete items, add items, edit items by, for example, the same steps as in the utilization of a word processor. The user could then utilize the rescheduled and edited transcript to play a new version of the originally played radio-on-demand session. These capabilities are particularly advantageous in preparing, for example, a presentation, lecture, or lesson, including multimedia items which may be available for download and use by students.

It is emphasized that in a preferred embodiment, following the initial setup of a Multimedia Player with a user's information preferences, a radio-on-demand session need not require anything more than what is required to, for example, play a preset FM radio, i.e., turn the radio on. It is intended that generally, after the pressing of the play key, the Multimedia Player automatically initiates playing radio-on-demand without the necessity of any further user interaction or instructions. In those implementations that utilize interactive and recursive features, a user's apparatus can transparently fine tune its capacity to deliver to the user what the user desires.

It is also emphasized that the process of receiving information and interleaving and sequencing of audio and information is preferably repeated throughout a radio-on-demand session as per the information preferences and/or the schedule preferences. Clearly, since information is of most value when it is most current, to the degree that it is advantageous, the information is obtained and played in a substantially real-time basis.

It is also emphasized that the number of items in a user's audio library need not be extensive. A longer radio-on-demand session can be accommodated by, for example, playing musical items more than once by, for example, looping the playlist, creating new playlists, continually randomly selecting musical units, or combinations of these.

An audio library database may maintain a log of when the items have been acquired and played to, for example, avoid overplaying a limited selection of audio items, and/or to play audio items the required number of instances. Frequency patterns can be established for the playing of audio items, e.g., as the number of days from the acquisition day increases the number of times a song is played is exponentially decreased.

A multiple playing tracking may be set in such a manner as to ensure that all of the audio units that may be played are played within a user selected number of sessions. For example, a user may determine, based on a first listening, that the user is likely to desire to listen to a musical item a total of ten times over the next three four-hour radio-on-demand sessions. Accordingly, the tracking software would cause the musical item to be played six times the first session, three times the second, and one time the third session.

Still alternatively, or additionally, the tracking software may itself code the various audio items for the number of projected playings based on, for example, similarities to other musical selections. Still alternatively, or additionally, audio units may be coded with or associated with a random function to enable playing responsive to, for example, a number/bit code, assigned to a audio unit, that is compared for a match with a software extracted or randomly generated number/bit. The randomness of the playing of multi-play audio units may be established with respect to any number of different probabilities.

Additionally, different probabilities may be established for different playings. For example, a playing of a audio unit may be responsive to a 100% probability in a first playing, a 66% probability in a second playing, and 10% probability in any playing after the second playing. Further, different random settings can be set for, for example, each user in a household. Still further, a multiple playing of an audio unit may be dependent on a playing of other audio units.

A Multimedia Player's capability to obtain audio and information from a remote provider permits a user to efficiently obtain audio units and/or information from a remote library or a plurality of libraries, to be played at the time of the user's choosing. Similarly, a playlist need not comprise or result from a single audio library. A playlist may result from the automated selection of a variety of audio units from one or a plurality of audio libraries.

To obtain audio and information, a user may establish preference of considerable detail, including, for example, a variety of keywords to describe the subject matter and content. Further, audio and information may be obtained by, for example,: i) specifying a title or code obtained from a reference guide; ii) making a selection from a listing in alphabetical order by title, subject matter, categories, etc.; iii) tree structure of classifications, for example advertisements, automobiles, 4WD; iv) keyword searching and retrieval (similar to the AUTOMATED PATENT SEARCH patent retrieval implementation); and v) any combination of these. It is noted that a reference guide may be available in a printed format or, preferable, a real-time format compatible with a Multimedia Player, e.g. retrieved from a Web site.

In the event that a match between a user's content requirements is not exactly satisfied by the available audio and/or information, the search software may, at the user's option or by default, reduce or eliminate content criteria to provide a listing or selection that approximates as close as possible the user's requirements. A listing of available audios could be in a form similar to that provided by an ALTAVISTA web search engine with links to home pages and/or links that would play, for example, an excerpt.

An audio library database may also store data and information obtained during a radio-on-demand session, including linkages to web sites/pages, to enable a user to obtain the information played and/or additional information. In this fashion, a playing of a plurality of radio-on-demand sessions can produce a database with significant amounts of personalized and highly relevant data and information.

Separate routines are implemented to supplement and maintain the information without requiring the user to conduct a radio-on-demand session. In other words, for example, in the absence of a user, a Multimedia Players software can conduct virtual radio-on-demand sessions to, for example, "listen" to new selection and, in due course, offer recommendations, and/or collect and update information in the database.

Where audio items are retrieved from a remote source, utilization of the audio units included in a playlist need not await the completion of the downloading of all of the items. The user can begin playing audio in real-time while the audio and information in the playlist are being downloaded in real-time or non-real-time (burst downloading). Further, the downloading need not be accomplished in one session. Short burst downloading will provide a portion of the content. As that portion is utilized control software will re-link the Multimedia Player with the provider, request and receive a next portion, and disconnect the active linkage. During this operation, automatic and transparent to the user, a constant playing is maintained.

Short burst downloading is also, for example, advantageous where a provider's resources are challenged by a plurality of end users. By utilizing short burst downloading and overlaps, a single stream is able to serve a plurality of end users simultaneously. The control logic of this architecture is analogous to that utilized by single waiter serving a plurality of parties (tables) in a restaurant.

Alternative to a Multimedia Player initiating the re-linkage with a provider, the control logic of the video server periodically checks on the progress of the end users, downloading and scheduling subsequent transmissions responsive to each end users needs and the overall demand on the available resources.

In an on-line architecture, whether broadcast or pointcast, a Multimedia Player comprising principally communications capabilities without significant local storage, processing, or memory, is adequate. In such an architecture, a user's preferences, if not stored in the Multimedia Player, may be retained by the video provider. An on-line architecture is advantageous in a compact portable Multimedia Player implementation. A portable radio-on-demand player can also be used to pre-load a complete radio-on-demand session to be played at a subsequent time by a user. Such a preloaded session skips the storage of audio, programming, or information which if not updated is of no value to the user, e.g. stock quotes prior to the markets closing or specified time.

Figure 9:
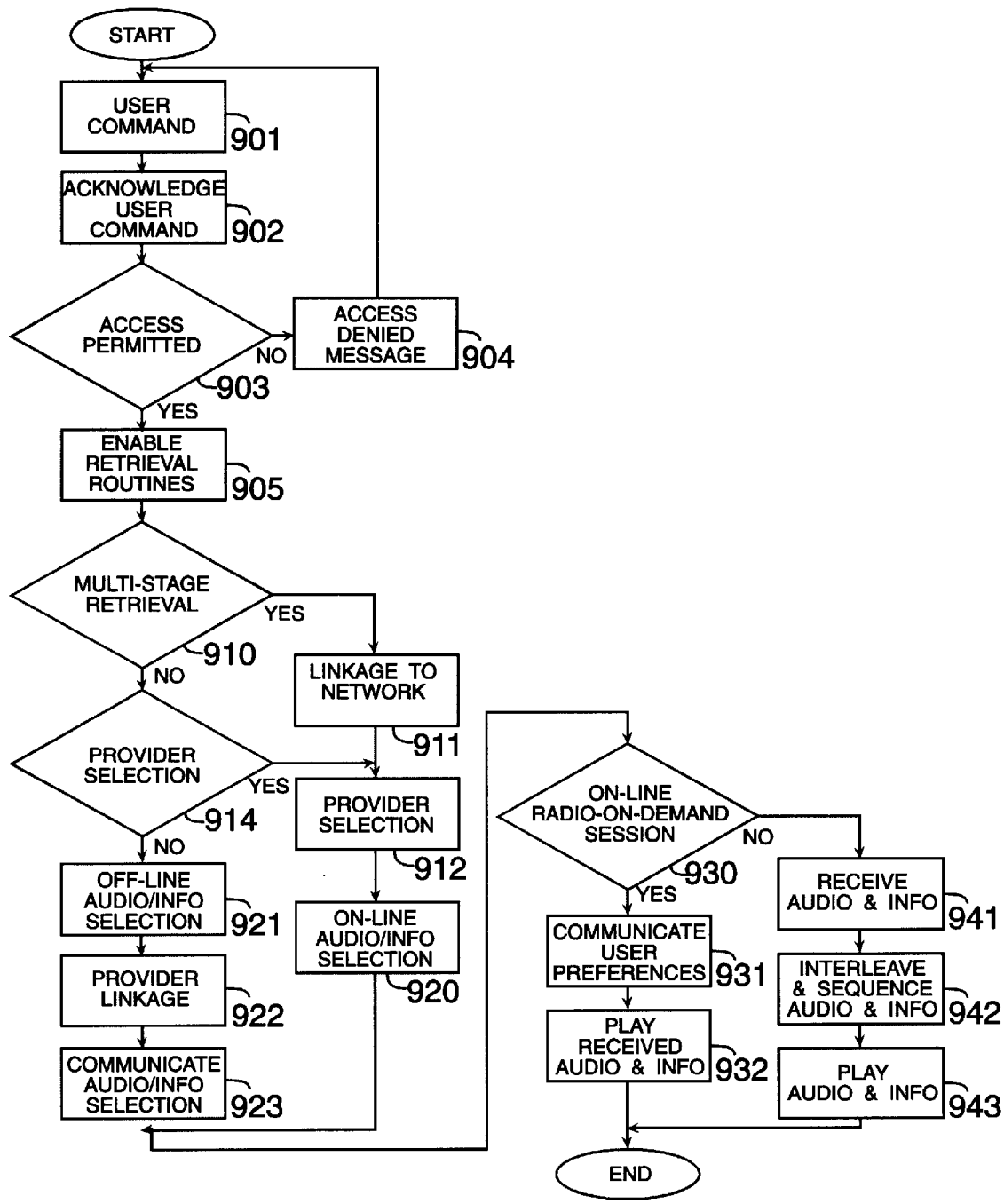
FIG. 9 is a flow chart detailing the steps of retrieving audio/info from a provider.

FIG. 9 is a flow chart further detailing the steps of retrieving audio/info from a provider. It is noted that handshaking and other routines are flexible and user configurable and a number of permutations and variations of what is detailed are possible.

Upon receipt of an user command 901, a Multimedia Player provides power to the required units and subsystems to be able to produce audible content, and transmits an appropriate acknowledgment 902.

Access routines previously detailed with respect to FIG. 7 steps 711–716 are summarized in FIG. 9 as steps 903–904.

In an embodiment, although not necessarily, these routines reside within a Multimedia Player and are executed prior to, or after, establishing a communications linkage with either a network administrator or directly with a provider.

As previously detailed, if access is denied 903, an error message 904 is provided and the Multimedia Player is returned to the state prior to the user activation request 901. Delay routines may be implemented to provide the user the opportunity to attempt to obtain access without a Multimedia Player going to "sleep".

If access is permitted 903, retrieval routines are enabled 905 to permit the remote retrieval of audio and/or information. In a multi-stage retrieval situation 910, e.g., when the user first establishes communications with the network administrator 911, e.g., an ISP, a cable, and/or telephone company, a particular provider 912 is first selected, and then the desired content is requested 920. Alternatively, retrieval routines 914 permit a direct selection of a provider 912. Content selection 920 then proceeds on-line with the selected provider. A provider can be preestablished as in the selection of a long distance communications carrier. In that case, the user would skip having to select a provider immediately prior to an audio/info request. Further, a user may establish relationships with specific providers for specified services.

Still further, an off-line content selection process 921 itself may determine with which provider a communications linkage is automatically established 922. The result of the content selection process is automatically communicated 923 to the appropriate provider upon the establishment of a communications linkage. Clearly, the selection of a provider is not required in those instances where a user obtains all the services from a single provider, web site, or source.

It is noted that other combinations are possible and that retrieval routines may reside within a Multimedia Player to further minimize the on-line time, or be provided on-line at different points in the communications than shown here. The content selection process may implement any one or more routines that are suggested by the examples herein provided and incorporated.

Once audio/info content is selected, if the user remains on-line during a playing of a radio-on-demand session 930, the appropriate user preferences are communicated to the provider 931. The provider then applies the user's preferences, interleaves and sequences the audio and information, and produces a seamless transmission of sequenced and interleaved audio and information that is responsive to the user's preferences and which is played 932. In this case the user remains on-line during the listening of the radio-on-demand session 932, but has access to control functions as if the content was retrieved from a Multimedia Player's storage devices.

Alternatively, when the audio and/or information that may be required is downloaded from the provider 941. Utilization of the downloaded data is then the same as previously detailed with respect to FIG. 7. In this case the interleaving and sequencing of the audio and information responsive to the user's preferences 942 is performed by the Multimedia Player, which then audibly plays the information within a playing of, for example, the musical and program items 943.

It is again emphasized that whether detailed with respect to FIGS. 7, 8, and/or 9, audio and information items for a radio-on-demand session may be retrieved from: i) a single local source; ii) a single remote source; iii) a combination of a local source and a remote source; and/or iv) any combination of one or a plurality of local sources and one or a plurality of remote sources.

As previously detailed, in a preferred embodiment a Multimedia Player is capable of simultaneously receiving, managing, and seamlessly integrating a plurality of audio, video, data, voice/video digital and/or analog communications and transmission. For example, while a Multimedia Player is playing a radio-on-demand session, the Multimedia Player may receive a communication. The communication may be in the form of a phone call, videophone call, fax, messaging and paging, and any analog or digital transmission. Thus, a user may prefer to, for example, interrupt a radio-on-demand session for phone calls on the business line and emails to the business email address, but not for personal communications.

A radio-on-demand and communication system for integrating the playing of a radio-on-demand session with the reception of a communication unrelated to the session comprises for example: i) means for playing a radio-on-demand session; ii) communicating means for receiving a communication unrelated to the radio-on-demand session; iii) accepting means for selectively accepting the communication; iv) terminating means for terminating the communication; v) pausing means, responsive the accepting means, for automatically pausing the playing of the radio-on-demand session; vi) resuming means, responsive to the terminating means, for resuming the radio-on-demand session; vii) updating means for updating the radio-on-demand session's scheduled information; and viii) rescheduling means for rescheduling the radio-on-demand session.

Figure 10:
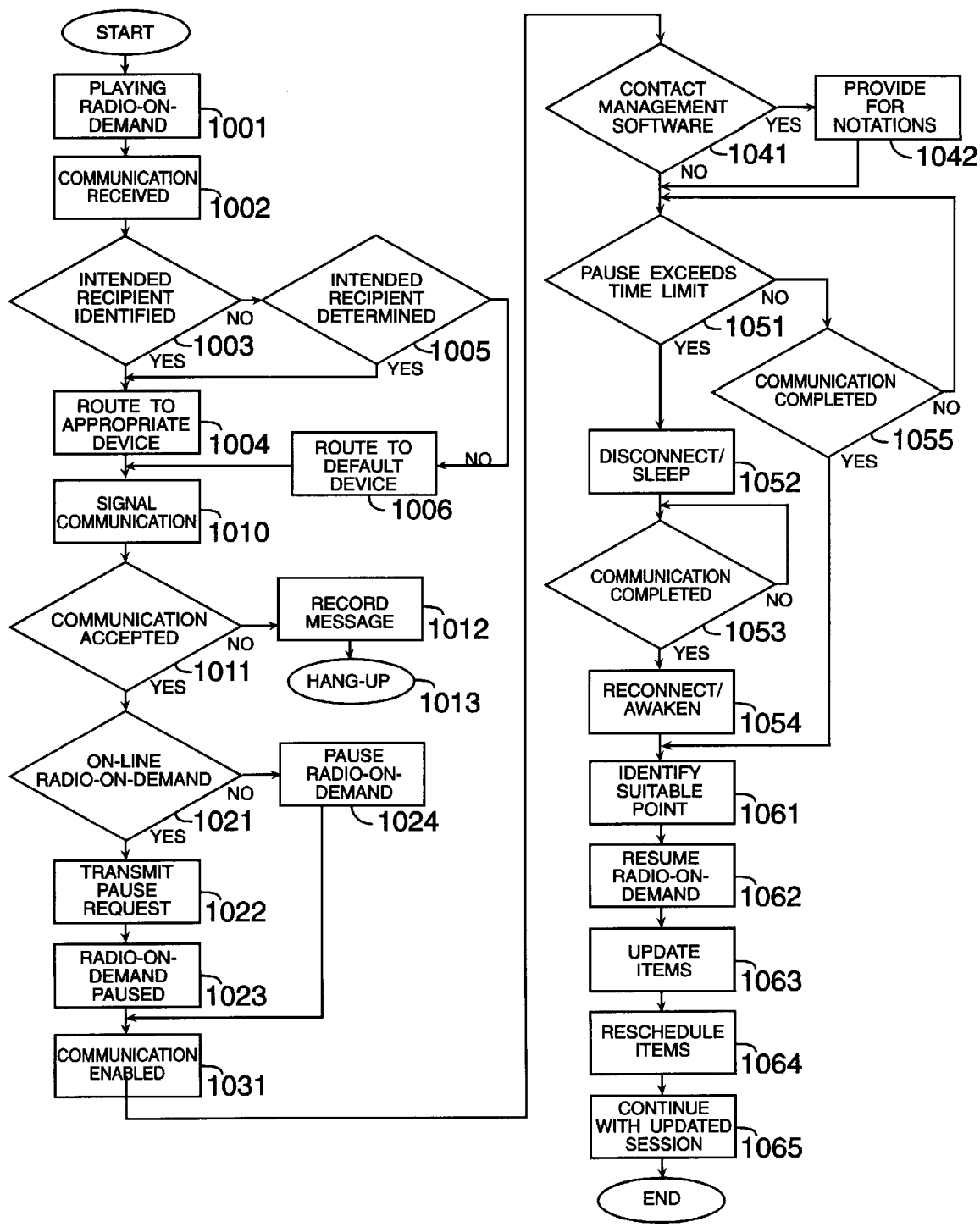
FIG. 10 is a flow chart detailing the steps of integrating a radio-on-demand session with a reception of a communication unrelated to the radio-on-demand session.

Referring to FIG. 10, a user is likely to have identified himself or herself to a Multimedia Player as was previously detailed with respect to FIG. 7. Similarly, the user of a computer-type application may have logged in, and thereby also provided a Multimedia Player with his/her identity. Thus, during a Multimedia Player's playing of a radio-on-demand session 1001 as, for example, previously detailed with respect to FIGS. 7, 8, and 9, if the Multimedia Player receives a communication 1002 and if the communication identifies the specific intended recipient 1003, a Multimedia Player's software routines are able to automatically direct the communication to an appropriate device 1004.

Alternatively, depending on the nature of the communication, a Multimedia Player may provide the originator of the communication the means to direct the routing of the communication. For example, in a voice call, voice response software will provide the caller an appropriate voiced menu to provide the routing information. Other means active or passive may be available for a Multimedia Player to determine the proper routing 1005. For example matching "Caller ID" with a table matching callers with recipients.

If proper routing of the communication cannot be determined by a Multimedia Player, the communication is directed to a default device consistent with the character of the communication 1006. For example, in the case of a fax to fax machine or a Multimedia Player's fax software.

In this example, during a playing of a radio-on-demand session 1001, a videophone communication 1002 is received, at which point an appropriate video and/or audio signal 1010 to an appropriately routed audio/video means is provided. The signal may include caller identification and other data relevant to or associated with the call.

If the user accepts the call 1011, the Multimedia Player initiates routines 1021–1023 to cause playing of the radio-on-demand session to be paused 1024. User acceptance of the communication may include, for example, picking up a receiver, pressing a key on a remote control device, a voice command, or directly touching an icon on a screen either in a remote control device or on the display itself. Thus, a single user action or command 1011 both accepts the call and pauses the radio-on-demand session 1024. Optionally, a user may configure the communication accepting routines to automatically accept communications.

Where the radio-on-demand session is being retrieved from a provider 1021, the Multimedia Player transmits to the provider the appropriate pause commands 1022 causing the provider to pause the transmission of the radio-on-demand session 1023.

If the user does not accept the call during a predefined time or the communication is automatically rejected, the Multimedia Player terminates the audio/video signal, if one was provided, and engages a communications recording function or device to receive a message 1012. At the end of the message, the Multimedia Player hang-up on the communication 1013.

An automatic integration of the playing of a radio-on-demand session and the acceptance of a communication may be variously configured by the user. The user may configure the Multimedia Player to cause a display of information relating to the incoming communication (data and image) on a display window, without necessarily pausing the transmission of the radio-on-demand session.

The flow chart of FIG. 10 presumes that the user has configured the system to pause the radio-on-demand session when a communication is accepted and made audible to the user 1031.

When contact management software is available, and if the communication is deemed to require the use of such software 1041, the user is provided the opportunity to make such notations with respect to the communication 1042 as the user may require. Additionally and/or alternatively, the user may cause or pre-configure the Multimedia Player to log and/or record the communication. The screen display is intended to accommodate both a communications window and a contact management window.

When a pause in the radio-on-demand session, whether resulting from the acceptance of a communications or a user's pause command, exceeds a certain time limit 1051, the Multimedia Player may automatically disconnect the linkage to the video server or put, for example, the disc module to sleep 1052. In such instances the Multimedia Player and/or the provider retain the required information to initiate the transmission of the radio-on-demand session at the appropriate point. Upon completion of the communication 1053/1055 or when the play command is issued by the user, if disconnection occurred or the disc module was put to sleep 1052, the Multimedia Player will reestablish the linkage with the provider and/or awaken the disc module 1054.

Contemporaneously with the acceptance of the communication 1011, routines are enabled to identify a point at which to resume the radio-on-demand session 1061, resume the radio-on-demand session responsive to the identified suitable resumption point 1062, update the radio-on-demand session's information items 1063, reschedule and/or delete item(s) in the radio-on-demand session 1064, and continue the radio-on-demand session responsive to the updating and the rescheduling 1065.

A radio-on-demand session may be resumed, responsive to a user's preferences and the duration of the communication, at the point placed on hold, at some predefined amount of time prior to the point placed on hold, at a beginning of an audio unit, at a beginning of a next audio unit, and/or at a suitable prior or following point that is identified by the radio-on-demand session schedule. Since, the schedule of the radio-on-demand session identifies the beginning point of the audio unit in which the pause occurred, and the beginning point of a following audio unit, it is advantageous to utilize the radio-on-demand session schedule to automatically identify a suitable point 1061 to resume the radio-on-demand session 1062.

In instances where at least a portion of the audio unit prior to the paused point is replayed, the user re-engages the radio-on-demand session without a loss of continuity. This is particularly advantageous when, for example, playing an interview.

Since the duration of the communication is significant to, for example, the currency of the information which may have been retrieved and scheduled for playing, the updating 1063 and rescheduling 1064 routines need not be enabled prior to resumption of the radio-on-demand session 1065. The resumption of the radio-on-demand session 1062 with, for example, a musical item provides the time that may be required to update information items no longer current 1063 and reschedule the items in the session 1064. This time may be extended with, for example, a playing of another song.

In a portable Multimedia Player implementation comprising only one external communications means, e.g., a single phone line, utilized by the reception of the communication, the updating of the items 1063 would occur after the communication is completed 1053 and the portable Player is able to "call" the provider to obtain updated information.

Thus, in the method detailed with respect to FIG. 10, a communication is synergistically incorporated within and becomes a part of a radio-on-demand session, and with a single user command, whether play or the termination of the communication, the radio-on-demand session is resumed from a suitable point relative to the point at which it was paused, updated and rescheduled.

Figure 11:
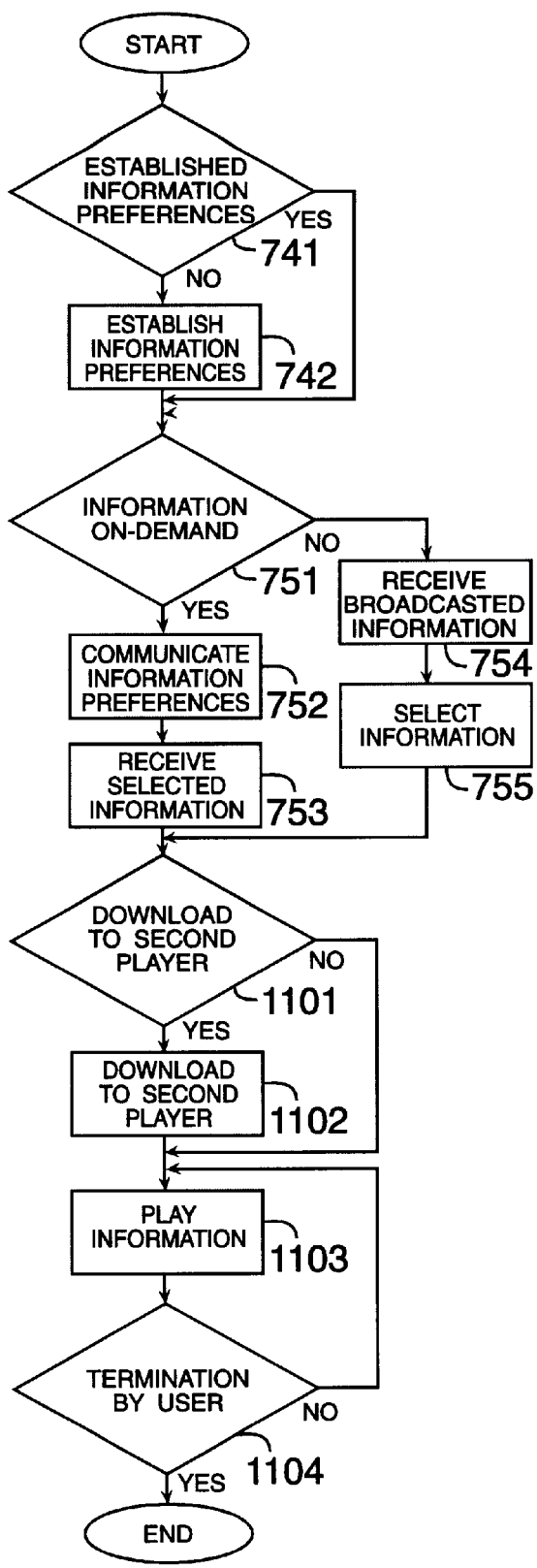
FIG. 11 is a flow chart detailing the steps of the downloading of audio and/or information responsive to a user's information preferences from a remote source and in due course to a portable device for subsequent playing.

While the disclosure has principally focused on the integration of the playing of musical items with a playing of informational items, the scope of the present inventions do not require a playing of musical items. For example, a user may desire to download to a portable Multimedia Player only informational items including, news of interests, emails, and other communications to be played while, for example, driving or exercising. FIG. 11 is a flow chart detailing the steps of the downloading of audio and/or information responsive to a user's information preferences from a remote source and in due course to a portable device for subsequent playing.

A comparison of the method of FIG. 11 with the method of FIG. 7 reveals that music preferences and the playing of musical items present in the method of FIG. 7 are not active in the method of FIG. 11. In the method of FIG. 11, if information preferences have been preestablished 741 and they are not to be modified, then initialization proceeds with the routines required to obtain information 751. If the information preferences have not been preestablished 741, or they are to be modified, then initialization proceeds with enabling the routines required to establish information preferences 742.

In those instances where the transmission of the information can be responsive to the information preferences, i.e., on-demand 751, then the information preferences and/or the required information are communicated to the information provider 752, and the information that is selected in response to the information preferences and/or the required information is received 753. Otherwise, for example, broadcasted information is received 754, to which the information preferences may be applied to select only the appropriate information 755. A radio-on-demand session need do nothing more extract informational items being broadcasted.

In the method of FIG. 11, a radio-on-demand session is further advantageously and significantly distinguished by the subsequent step, if required 1101, of downloading the informational items from the Multimedia Player that obtained them to a second Multimedia Player 1102 (e.g., a portable player) for subsequent playing of the information items 1103 until, for example, the user terminates the playing 1104. In this case, the user is likely to control and manage the operation of both devises.

In those instances where the informational items are directly received by the Multimedia Player, portable or not, that the user will utilize to play the informational items 1101, then the step of downloading 1102 is skipped.

It is emphasized that the various methods and steps detailed with respect to FIGS. 7–11 are not mutually exclusive. For example, a user may start to play interleaved and sequenced musical and informational items as detailed with respect to FIG. 7 steps 701–762 by means of a PC. At some point the user may terminate the playing 763, and download only the balance of the informational items that have not been played to a portable digital audio player for subsequent playing as detailed with respect to FIG. 11 steps 1102–1103.

Further, it is also noted that steps in a method and between methods may be repeated. For example, the process of downloading content between players could be repeated between two players in either direction any number of times. This would be particularly advantageous where a downloaded informational item is an advertisement for which the user receives a credit for an apparent listening, as previously detailed with respect to FIG. 8. In this case, the second Multimedia Player would transfer back to the first Multimedia Player the required listening verification data.

The teachings disclosed herein, directly and indirectly by, for example, incorporation, are intended to show a variety of architectures, services, capabilities, systems, methods, and inventive elements which are combined, and may be combined, to suit particular embodiments. The synergies among and between the various inventive elements is a significant feature of the disclosures herein. Where a teaching may be deemed to be at cross purposes, or otherwise incompatible, with some other teaching, it ought to be understood as a possible alternative to be utilized as a particular embodiment may require.

While elements of the inventions have been detailed in conjunction with specific embodiments thereof, it is evident that many alternatives, modifications and variations are possible and will be apparent to those skilled in the art in light of the foregoing description. Accordingly, it is intended to embrace all such alternatives, modifications, variations, and combinations as fall within the spirit and scope of the specification.

The intent of incorporation is to derive the full benefits of the integration of the teachings herein with the teachings of the references cited. The incorporation by reference at a specific place within the specification is not intended to limit the extent to which the reference is incorporated, or the manner in which it may be integrated. The teachings that has been cited and incorporated herein are offered by way of example, and not limitation, of the underlying foundation of knowledge and skill that is available to a practitioner.

Since the art is well established, many of the features, components, and methods found therein may be incorporated, as suggested herein, in a preferred embodiment; and since other modifications and changes varied to fit particular requirements and environments will be apparent to those skilled in the art, the inventions are not limited to the embodiments explicitly set forth or suggested herein. It is to be understood that the inventions are not limited thereby. Examples that have been provided are not intended to limit the scope of the specification. It is also to be understood that the specific details shown are merely illustrative, and that the inventions may be carried out in other ways without departing from the spirit and scope of the specification.

What is claimed is:

1. An apparatus capable of playing audio, the apparatus comprising:

communicating means for communicating a user's information preferences to a remote information provider, and for receiving informational items that are responsive to said user's information preferences;

processing means for alternating and sequencing, for said user, a playing of the received informational items with a playing of a plurality of musical items included in an audio library of said user; and playing means for playing, for said user and responsive to said alternating and sequencing, said received informational items within a playing of said plurality of musical items.

2. The apparatus of claim 1, wherein a playing of at least one informational item comprises a voice synthesizing of data obtained from an internet-based information provider.

3. The apparatus of claim 1, wherein a playing of an at least one informational item is responsive to a schedule preferences of said user; and wherein a playing of musical items is responsive to a tracking of a multiple playing of a musical item.

4. The apparatus of claim 1, wherein a verified apparent listening of a playing of an at least one informational item is associated with a credit given to said user.

5. The apparatus of claim 1, wherein a communication for said user and unrelated to the received informational items is received and integrated within a playing of musical items.

6. An apparatus capable of playing audio, the apparatus comprising:

communication means for receiving a plurality of informational items from a remote information provider;

processing means for selecting informational items from said plurality of informational items responsive to a user's information preferences, and for alternating and sequencing, for said user, a playing of the selected informational items with a playing of a plurality of musical items included in an audio library of said user; and playing means for playing, for said user and responsive to said alternating and sequencing, said selected informational items within a playing of said plurality of musical items.

7. The apparatus of claim 6, wherein a playing of at least one informational item comprises a voice synthesizing of data obtained from an internet-based information provider.

8. The apparatus of claim 6, wherein a playing of an at least one informational item is responsive to a schedule preferences of said user; and wherein a playing of at least one informational item is activated by a play control corresponding to a preestablished information preference.

9. The apparatus of claim 6, wherein a verified apparent listening of a playing of an at least one informational item is associated with a credit given to said user.

10. The apparatus of claim 6, wherein a communication for said user and unrelated to the received informational items is received and integrated within a playing of musical items.

11. A method of playing audio, the method comprising the steps of:
- communicating a user's information preferences to a remote information provider;
- receiving, from said information provider, informational items that are responsive to said user's information preferences;
- alternating and sequencing, for said user, a playing of the received informational items with a playing of a plurality of musical items included in an audio library of said user; and
- playing, for said user and responsive to said alternating and sequencing, said received informational items within a playing of said plurality of musical items.

12. The method of claim 11, wherein a playing of at least one informational item comprises a voice synthesizing of data obtained from an internet-based information provider.

13. The method of claim 11, wherein a playing of an at least one informational item is responsive to a schedule preferences of said user; and wherein a playing of musical items is responsive to a tracking of a multiple playing of a musical item.

14. The method of claim 11, wherein a verified apparent listening of a playing of an at least one informational item is associated with a credit given to said user.

15. The method of claim 11, wherein a communication for said user and unrelated to the received informational items is received and integrated within a playing of musical items.

16. A method of playing audio, the method comprising the steps of:
- communicating, by means of a first apparatus, a user's information preferences to a remote information provider;
- receiving, from said information provider and by means of said first apparatus, informational items that are responsive to said information preferences;
- alternating and sequencing, for said user, at least some of the received informational items with a plurality of musical items included in an audio library of said user;
- downloading from said first apparatus to a second apparatus the alternated and sequenced informational and musical items; and
- playing, by means of said second apparatus, the downloaded alternated and sequenced informational and musical items.

17. The method of claim 16, wherein a playing of at least one informational item comprises a voice synthesizing of data obtained from an internet-based information provider.

18. The method of claim 16, wherein at least one of said downloaded informational items is at least a portion of a previously broadcasted program.

19. The method of claim 16, wherein a verified apparent listening of a playing of an at least one informational item is associated with a debit.

20. The method of claim 16, wherein a communication for said user and unrelated to the received informational items is received and integrated within said playing.

* * * * *